US012578671B2

(12) United States Patent
Morimoto

(10) Patent No.: US 12,578,671 B2
(45) Date of Patent: Mar. 17, 2026

(54) IMAGE FORMING APPARATUS FOR DISPLAYING SHEET INFORMATION

(71) Applicant: CANON KABUSHIKI KAISHA, Tokyo (JP)

(72) Inventor: Kazusa Morimoto, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/776,804

(22) Filed: Jul. 18, 2024

(65) Prior Publication Data

US 2025/0028269 A1 Jan. 23, 2025

(30) Foreign Application Priority Data

Jul. 19, 2023 (JP) ................................. 2023-117862

(51) Int. Cl.
*G03G 15/00* (2006.01)

(52) U.S. Cl.
CPC ..... *G03G 15/5029* (2013.01); *G03G 15/5016* (2013.01); *G03G 2215/00616* (2013.01); *G03G 2215/00637* (2013.01); *G03G 2215/00742* (2013.01); *G03G 2215/00751* (2013.01)

(58) Field of Classification Search
CPC ........... G03G 15/5016; G03G 15/5029; G03G 2215/00616; G03G 2215/00637; G03G 2215/00742; G03G 2215/00751
USPC .................................................... 399/45, 389
See application file for complete search history.

(56) References Cited

U.S. PATENT DOCUMENTS 8,635,912 B2 * 1/2014 Aoki ................. G03G 15/6558 399/389
2023/0188658 A1 * 6/2023 Tsujimoto .......... H04N 1/00729 358/1.13

FOREIGN PATENT DOCUMENTS

JP 2021033214 A 3/2021
JP 2023017222 A 2/2023
JP 2023074406 A 5/2023

* cited by examiner

*Primary Examiner* — Hoang X Ngo
(74) *Attorney, Agent, or Firm* — Canon U.S.A., Inc. IP Division

(57) ABSTRACT

A control unit determines sheet information based on a result of detection performed by a media sensor, and in a case where a threshold is changed after the determined sheet information is displayed on a display, the control unit determines sheet information based on the result of the detection and the changed threshold, and the display displays the sheet information.

7 Claims, 25 Drawing Sheets

IMAGE FORMING APPARATUS FOR DISPLAYING SHEET INFORMATION

BACKGROUND

Field of the Disclosure

The present disclosure relates to an apparatus configured to form images on sheets.

Description of the Related Art

Recent electrophotographic image forming apparatuses include a media sensor to determine sheet types. The media sensor detects physical properties of sheets using an optical sensor and the like. The image forming apparatus determines a sheet type from pre-registered sheet information based on a result of detection performed by the media sensor.

The sheet type determination is performed based on the result of the detection performed by the media sensor and a determination table. Thresholds in the determination table are preset for the image forming apparatus. However, in a case where a result of the detection performed by the media sensor for a sheet is close to a threshold, a determination result for the sheet may vary.

Thus, for a user wishing to use a sheet for which the determination made by the media sensor may vary in a case where a normal threshold is used, an apparatus that allows the user to change a grammage threshold for an image forming apparatus is discussed (Japanese Patent Application Laid-Open No. 2021-33214).

However, in a case where the grammage threshold is changed by the user after a sheet is fed and the determination by the media sensor is performed, a sheet needs to be fed again in order to perform the sheet determination based on the changed threshold. This is inconvenient for the user.

SUMMARY

According to embodiments of the present disclosure, an image forming apparatus includes an image forming unit configured to form an image on a sheet, a sheet detection unit configured to detect a physical property of the sheet, a control unit configured to determine sheet information based on a result of the detection performed by the sheet detection unit and a threshold, and an operation unit configured to display the sheet information determined by the control unit and receive a user instruction to change the threshold, wherein, in a case where the operation unit receives the user instruction to change the threshold, the control unit determines sheet information based on the result of the detection and the changed threshold, and the operation unit displays the sheet information.

Further features of the present disclosure will become apparent from the following description of exemplary embodiments with reference to the attached drawings.

DESCRIPTION OF THE EMBODIMENTS

An image forming apparatus according to an exemplary embodiment of the present disclosure will be described below with reference to FIG. 1. As used herein, the term “grammage” refers to the mass of a sheet per unit area, and is represented in [g/m^2].

(Image Forming Apparatus)

Figure 1:
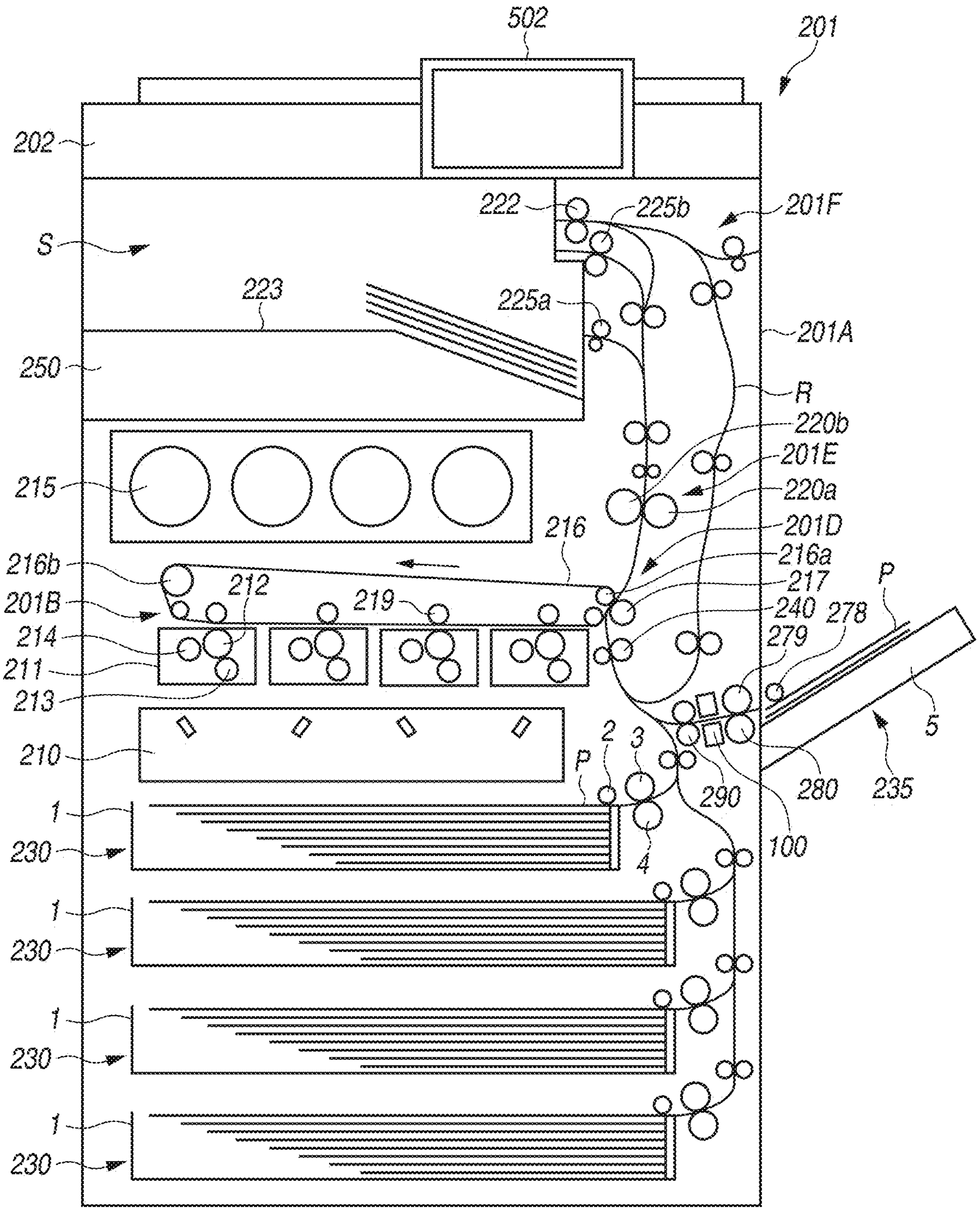
FIG. 1 is a diagram illustrating an image forming apparatus.

FIG. 1 is a cross-sectional view illustrating a schematic configuration of an image forming apparatus 201.

Figure 2:
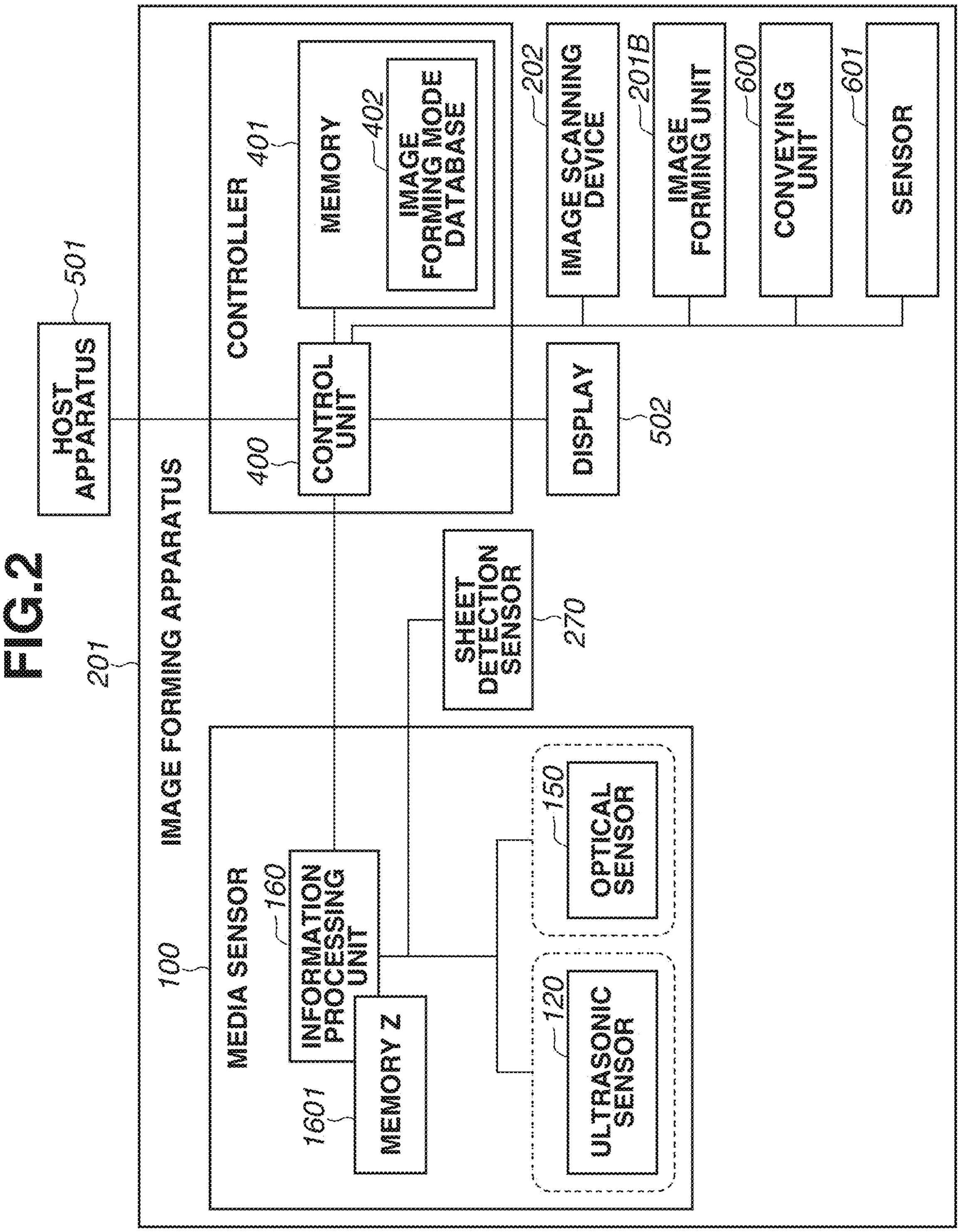
FIG. 2 is a diagram illustrating a control block diagram.

The image forming apparatus 201 is a laser beam printer with a tandem configuration using an intermediate transfer method and an electrophotographic process. The image forming apparatus 201 inputs image data output from a host apparatus 501 (FIG. 2). The image forming apparatus 201 is capable of forming an image on a sheet P, which is a recording medium, based on input image data.

FIG. 2 illustrates a control block diagram. A control unit 400 is a control unit that comprehensively controls the operation of the image forming apparatus 201 and transmits and receives information to and from the host apparatus 501 and a display 502. A memory 401 stores control programs and initial values of various settings value according to the present exemplary embodiment. The memory 401 stores an image forming mode database 402. The control unit 400 is connected to a media sensor 100 and an image forming unit 201B. The control unit 400 is connected to a conveying unit 600 for conveying sheets, the media sensor 100, and a sheet detection sensor 270. The control unit 400 is connected to a sensor 601 other than the media sensor 100 and the sheet detection sensor 270. The media sensor 100 includes an information processing unit 160, an ultrasonic sensor (sheet detection unit) 120, and an optical sensor (sheet detection unit) 150. The information processing unit 160 is connected to the ultrasonic sensor 120, the optical sensor 150, and the sheet detection sensor 270. The information processing unit 160 includes a memory Z 1601 therein. Details of the media sensor 100 will be described below.

The display (operation unit) 502 is a touch panel that displays various types of information and receives user instructions through a touch panel function. The control unit 400 controls the image forming operation by executing control programs stored in the memory 401.

In FIG. 1, an image scanning device 202 is situated on top of a main body 201A of the image forming apparatus 201. An ejection space S for sheet ejection is formed between the image scanning device 202 and the main body 201A of the image forming apparatus 201. The image scanning device 202 is connected to the control unit 400. While the image scanning device 202 is configured as part of the image forming apparatus 201 according to the present exemplary embodiment, this is not intended to be a limitation, and the image scanning device 202 may be configured as a separate apparatus from the image forming apparatus 201.

Cassette feeding portions 230 include sheet cassettes 1 storing the sheets P. The cassette feeding portions 230 include pickup rollers 2 for picking up sheets P stored in the sheet cassettes 1. The cassette feeding portions 230 include feed rollers 3 and retard rollers 4 for separating the sheets P conveyed from the pickup rollers 2. A manual feeding portion 235 includes a manual feeding tray 5. The manual feeding tray 5 is a unit for holding the sheets P. The manual feeding portion 235 includes a pickup roller 278 for picking up the sheets P placed on the manual feeding tray 5. The manual feeding portion 235 includes a feed roller 279 and a retard roller 280 for separating the sheets P conveyed from the pickup roller 278.

The media sensor 100 is situated on a conveyance path between the feed roller 279 and a pull-out roller 290. The media sensor 100 detects physical properties of the sheet P picked up by the pickup roller 278 and conveyed by the feed roller 279. While the media sensor 100 according to the present exemplary embodiment is situated at a position illustrated in FIG. 1, this is not intended to be a limitation.

For example, the media sensor 100 may be situated on a conveyance path between a pair of registration rollers 240 and the feed rollers 3 to detect sheets fed from the cassette feeding portions 230.

The image forming unit 201B includes a laser scanner 210 and four image forming units 211 for forming toner images of four colors that are yellow (Y), magenta (M), cyan (C), and black (K). Each image forming unit 211 includes a photosensitive drum 212, a charging device 213, and a developing device 214. The image forming unit 201B includes a secondary transfer portion 201D and a fixing portion 201E above the image forming units 211. Toner cartridges 215 supply toner to the developing devices 214.

The secondary transfer portion 201D includes a drive roller 216*a*, a tension roller 216*b*, and a transfer belt 216 stretched around the drive roller 216*a* and the tension roller 216*b*. The secondary transfer portion 201D includes primary transfer rollers 219. The primary transfer rollers 219 are in contact with the transfer belt 216 and situated on an inner side of the transfer belt 216 at positions opposite the photosensitive drums 212. The transfer belt 216 is rotated in an arrow direction by the drive roller 216*a*. The secondary transfer portion 201D includes a secondary transfer roller 217. The secondary transfer roller 217 is situated opposite the drive roller 216*a*.

The fixing portion 201E is disposed downstream of the secondary transfer roller 217 in the conveyance direction. The fixing portion 201E includes a pressing roller 220*a* and a heating roller 220*b*.

A pair of first ejection rollers 225*a* and a pair of second ejection rollers 225*b* are disposed downstream of the fixing portion 201E in the conveyance direction. A two-sided reversing portion 201F is disposed downstream of the pair of first ejection rollers 225*a* and the pair of second ejection rollers 225*b*. The two-sided reversing portion 201F includes a pair of reversing rollers 222 and a re-conveyance path R. The pair of reversing rollers 222 reverses the sheet P having a surface with an image formed thereon, and the re-conveyance path R is a conveyance path for conveying the reversed sheet P to the image forming unit 201B again.

The conveying unit 600 includes the pickup roller 278, the feed roller 279, the retard roller 280, the pull-out roller 290, the pickup rollers 2, the feed rollers 3, the retard rollers 4, and a motor that drives these rollers. The conveying unit 600 includes the pair of registration rollers 240 and a motor that drives the pair of registration rollers 240. The conveying unit 600 includes a motor that drives the secondary transfer roller 217, a motor that drives the pressing roller 220*a*, and a motor that drives the heating roller 220*b*. The conveying unit 600 includes the pair of first ejection rollers 225*a*, the pair of second ejection rollers 225*b*, the pair of reversing rollers 222, other rollers for sheet conveyance in the image forming apparatus 201, and a motor that drives these rollers.

The display 502 is disposed on top of the image forming apparatus 201 and receives operations from users. While the display 502 is configured as part of the image forming apparatus 201, this is not intended to be a limitation. For example, the display 502 may be configured as an apparatus different from the image forming apparatus 201 and electrically connected to the control unit 400 of the image forming apparatus 201.

(Image Forming Job of Image Forming Apparatus)

Next, the image forming operation of the image forming apparatus 201 will be described below. Initially, in response to receiving an instruction to start the image forming operation from the host apparatus 501, which is an external apparatus, the control unit 400 starts an image forming job. A user may input the instruction to start the image forming operation to the control unit 400 by operating the display 502. The image forming job refers to a series of operations from receiving an instruction to start the image forming operation to ejecting, to a stacking portion 223, a sheet having undergone the image forming operation. After receiving the instruction to start the image forming operation, the control unit 400 performs image processing on received image data. The control unit 400 drives the laser scanner 210 based on the image data. The laser scanner 210 sequentially exposes, using laser, each surface of the photosensitive drums 212 charged to a predetermined polarity and potential uniformly by the charging device 213 and forms an electrostatic latent image. Thus, yellow, magenta, cyan, and black electrostatic latent images are sequentially formed on the photosensitive drums 212.

Figure 3A:
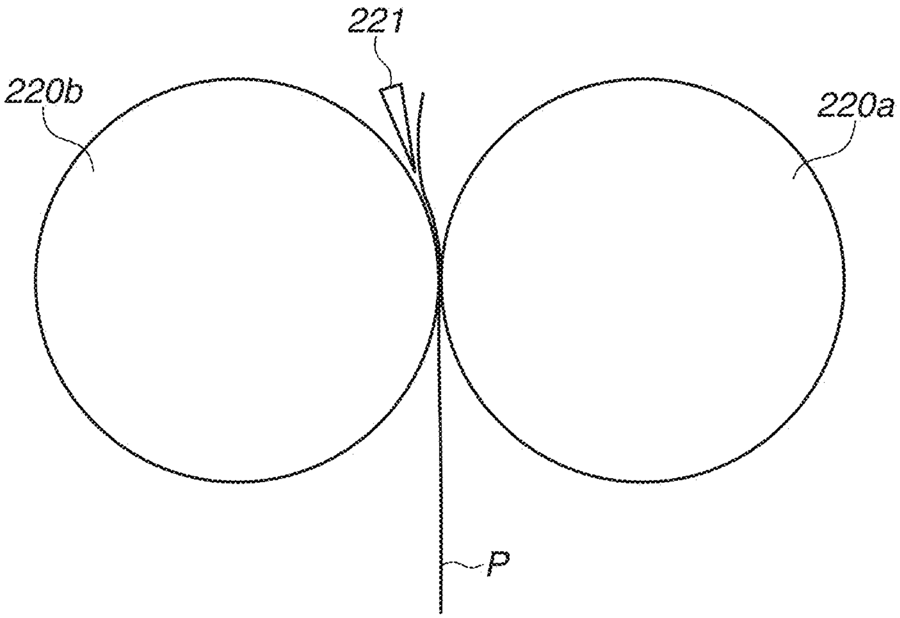
FIGS. 3A and 3B are each a diagram illustrating how a sheet is separated at a fixing portion.
Figure 3B:
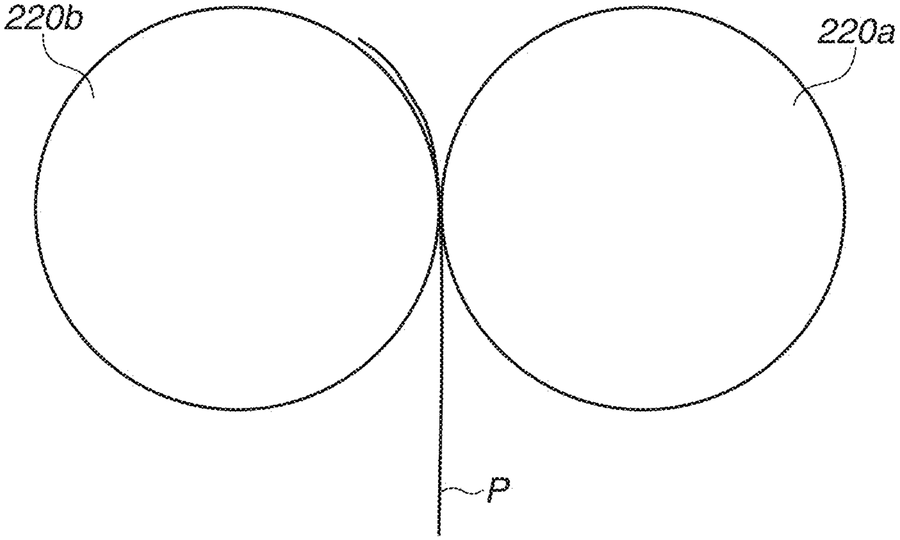

The developing device 214 develops the electrostatic latent images using toners of the corresponding colors and forms toner images. The respective toner images of the corresponding colors are sequentially overlaid and transferred onto the transfer belt 216 by a primary transfer bias applied to the primary transfer rollers 219. Thus, a toner image is formed on the transfer belt 216. In parallel to the toner image formation, a sheet P is fed from the cassette feeding portions 230 and conveyed to the pair of registration rollers 240. The pair of registration rollers 240 corrects skew of the sheet P. The pair of registration rollers 240 conveys the sheet P to the secondary transfer portion 201D. The secondary transfer portion 201D transfers the toner image on the transfer belt 216 onto the sheet P with a secondary transfer bias applied to the secondary transfer roller 217. The sheet P with the transferred toner image thereon is conveyed to the fixing portion 201E. The fixing portion 201E applies heat and pressure to the toner image on the sheet P at a roller nip of the pressing roller 220*a* and the heating roller 220*b* to fix the toner image to the sheet P. At this time, a sticking force to the heating roller 220*b* occurs on the sheet P due to an adhesive force of the melted toner. The sheet P that is not stiff (firm) enough is wound directly onto the heating roller 220*b* that is being rotated, so that a separation plate 221 (FIG. 3A) for separating the sheet P is provided downstream of the heating roller 220*b*. Without the separation plate 221, the sheet P may be wound directly onto the heating roller 220*b* being rotated as illustrating in FIG. 3B.

The pair of first ejection rollers 225*a* or the pair of second ejection rollers 225*b* disposed downstream of the fixing portion 201E ejects the sheet P with the image fixed thereto into the ejection space S. Thus, the sheet P is stacked on the stacking portion 223 at the bottom of the ejection space S. In a case where an image is to be formed on both surfaces of the sheet P, the sheet P with an image formed on one surface is conveyed to the re-conveyance path R by the pair of reversing rollers 222. The sheet P is conveyed to the image forming unit 201B again, and an image is formed on the other surface. Thereafter, the sheet P is ejected into the ejection space S by the pair of first ejection rollers 225*a* or the pair of second ejection rollers 225*b*. Thus, the image forming job by the image forming apparatus 201 is completed. The image forming operation is performed based on a set image forming mode.

Figure 13:
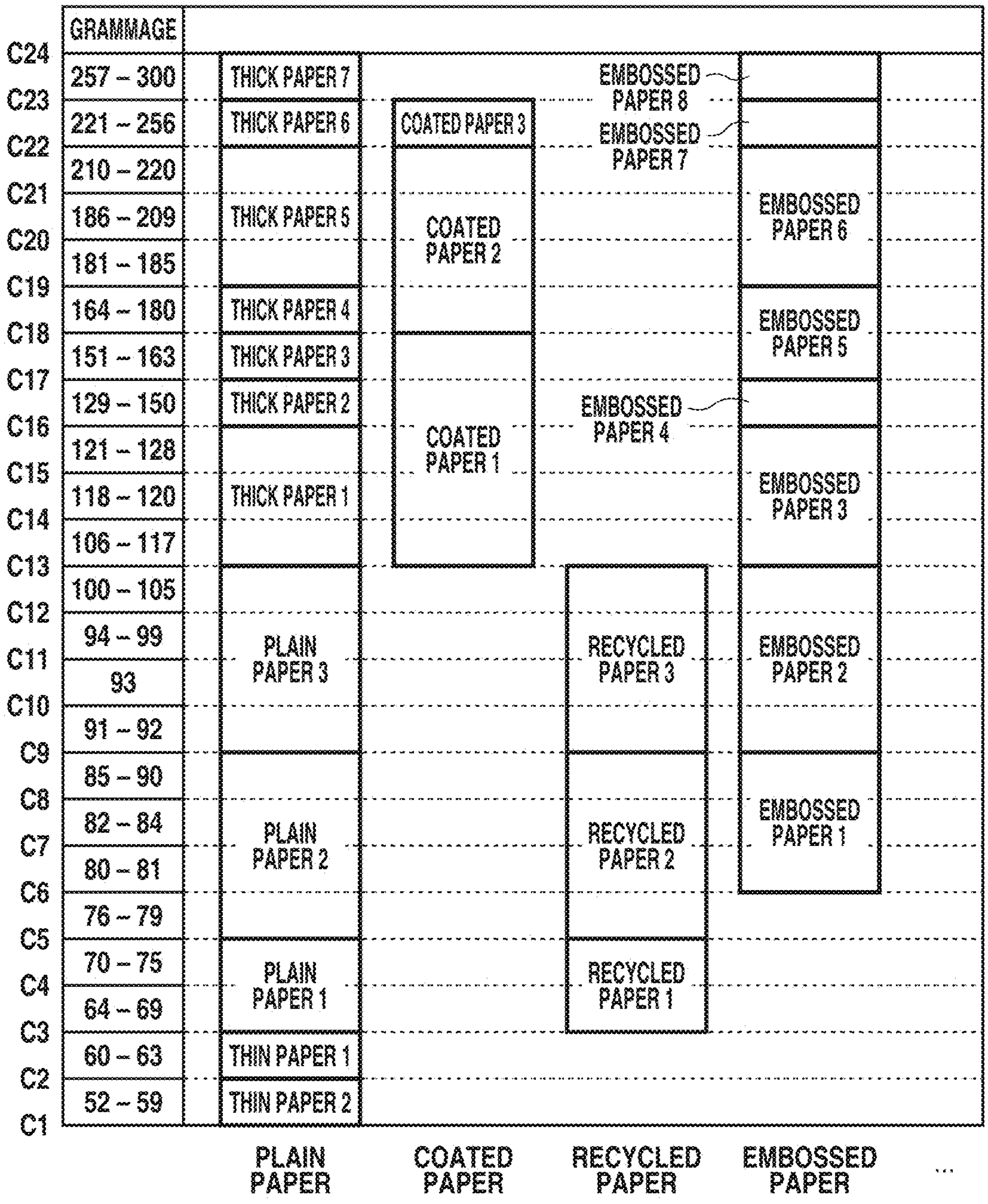
FIG. 13 is a diagram illustrating image forming modes for grammage ranges and sheet types.

The image forming modes refer to predetermined image forming conditions (e.g., a transfer voltage value of the secondary transfer portion 201D, a target temperature of the fixing portion 201E, a conveyance speed of the fixing portion 201E). Each image forming mode is given a name as illustrated in FIG. 13, such as "thin paper 1", "thin paper 2", "plain paper 1", "coated paper 1", "coated paper 2", or "coated paper 3". According to the present exemplary embodiment, the names in FIG. 13, such as "thin paper 1", "thin paper 2", "plain paper 1", "coated paper 1", "coated paper 2", and "coated paper 3", are included in information corresponding to the names of the image forming modes.

An optimal image forming mode varies depending on physical properties (grammage, surface characteristics) of a sheet on which image forming is to be performed. Sheets of different sheet types have different surface characteristics, so that there is a correlation between a surface characteristic of a sheet and its sheet type. Thus, in order to set an appropriate image forming mode, it is important to identify a grammage and a sheet type of a sheet to be used prior to the image forming operation. According to the present exemplary embodiment, a grammage and a sheet type of a sheet are determined based on a detection result of the media sensor 100.

(Configuration of Media Sensor)

As illustrated in FIG. 2, the media sensor 100 includes the ultrasonic sensor 120, the optical sensor 150, and the information processing unit 160. The information processing unit 160 instructs the ultrasonic sensor 120 and the optical sensor 150 to perform detection and processes detection results of the ultrasonic sensor 120 and the optical sensor 150. The sheet detection sensor 270 is a sensor configured to detect the presence or absence of a sheet, and the optical sensor 150 electrically connected to the media sensor 100 is a contact image sensor (CIS).

Figure 4:
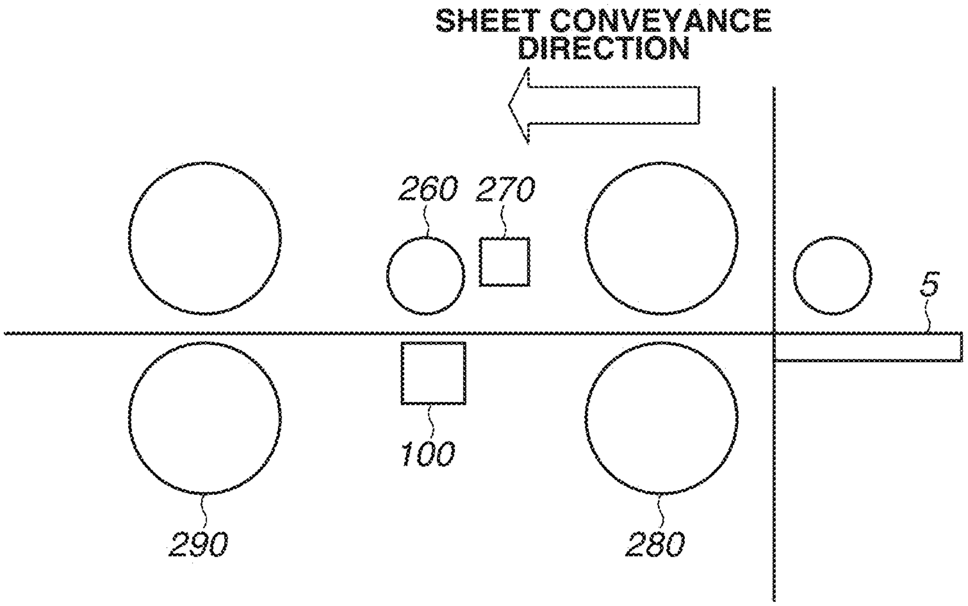
FIG. 4 is a diagram illustrating a media sensor viewed in a direction perpendicular to a sheet conveyance direction.
Figure 5:
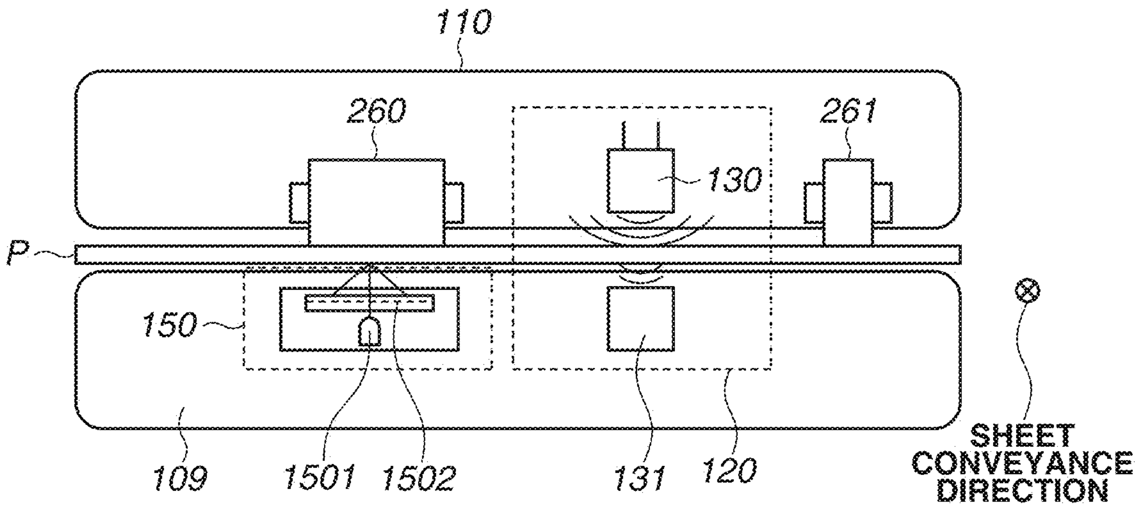
FIG. 5 is a diagram illustrating the media sensor viewed in the sheet conveyance direction.

A configuration of the media sensor 100 will be described below with reference to FIGS. 4 and 5. FIG. 4 is a diagram illustrating the media sensor 100 viewed in a direction perpendicular to a sheet conveyance direction. FIG. 5 is a diagram illustrating the media sensor 100 viewed in the sheet conveyance direction. As illustrated in FIG. 4, the media sensor 100 is disposed on the conveyance path between the feed roller 279 and the pull-out roller 290. The sheet detection sensor 270 is disposed upstream of the media sensor 100 and downstream of the feed roller 279 in the sheet conveyance direction. As illustrated in FIG. 5, the media sensor 100 includes the ultrasonic sensor 120 and the optical sensor 150. The ultrasonic sensor 120 includes an ultrasonic transmitter 130 and an ultrasonic receiver 131. The optical sensor 150 includes a light source 1501 (light emitting diode (LED)) and a line sensor 1502. During the sheet detection with the optical sensor 150 and during the sheet detection with ultrasound, the flutter of the sheet P being conveyed is to be reduced to stabilize the orientation of the sheet P. To reduce the flutter of the sheet P to stabilize the orientation of the sheet P, sheet holding rollers 260 and 261 are provided between the feed roller 279 and the pull-out roller 290. The sheet holding roller 260 is opposite the optical sensor 150 and is configured to press the sheet P against the optical sensor 150. This reduces the flutter of the sheet P and stabilizes the orientation of the sheet P while the optical sensor 150 measures a surface of the sheet P at a detectable area where the optical sensor 150 can perform detection. The sheet holding roller 261 is configured to press the sheet P against a lower block 109. A detectable area where the ultrasonic sensor 120 can detect the sheet P is between the sheet holding rollers 260 and 261 in a sheet width direction orthogonal to the sheet conveyance direction. This reduces the flutter of the sheet P and stabilizes the orientation of the sheet P while the ultrasonic sensor 120 measures the sheet P. In FIG. 4, the ultrasonic transmitter 130 is disposed to hide behind the sheet holding roller 260 and is, therefore, not illustrated in FIG. 4. In FIG. 4, the sheet holding roller 261 is disposed to hide behind the sheet holding roller 260 and is, therefore, not illustrated in FIG. 4.

(Acquisition of Grammage)

A grammage of a sheet is acquired based on a detection result of the ultrasonic sensor 120.

As illustrated in FIG. 5, the ultrasonic transmitter 130 and the ultrasonic receiver 131 are respectively disposed on the upper block 110 side and the lower block 109 side to sandwich the conveyance path through which the sheet P is conveyed.

The ultrasonic transmitter 130 and the ultrasonic receiver 131 each include a piezoelectric element (also referred to as "piezo element") and an electrode terminal. The piezoelectric elements are elements that convert mechanical displacement into electric signals. In a case where a pulse voltage with a predetermined frequency is input to the electrode terminal of the ultrasonic transmitter 130, the piezoelectric element of the ultrasonic transmitter 130 oscillates and emits ultrasound. The emitted ultrasound propagates through the sheet P to the ultrasonic receiver 131. The piezoelectric element of the ultrasonic receiver 131 receives the ultrasound propagated through the sheet P and generates an output voltage based on the amplitude of the received ultrasound at the electrode terminal of the ultrasonic receiver 131. The ratio between the output voltage without a sheet between the ultrasonic transmitter 130 and the ultrasonic receiver 131 and the output voltage with sheet between the ultrasonic transmitter 130 and the ultrasonic receiver 131 is a transmittance (transmittance coefficient). The ultrasound emitted from the ultrasonic transmitter 130 attenuates while traveling through the sheet P, and the ultrasonic receiver 131 receives the attenuated ultrasound. The degree of the ultrasound attenuation varies depending on the sheet grammage, so that the transmittance also varies depending on the sheet grammage. The sheet grammage can be estimated using the transmittance and a conversion formula between the transmittance coefficient of the ultrasound and the sheet grammage.

While the grammage is determined using a detection result of the ultrasonic sensor 120 according to the present exemplary embodiment, this is not intended to be a limitation. For example, a sheet may be sandwiched between a first roller fixed in a sheet thickness direction and a second roller movable based on the sheet thickness, and the grammage may be determined based on the amount of movement of the second roller.

(Acquisition of Surface Characteristic)

A surface characteristic of a sheet is acquired based on a detection result of the optical sensor 150.

As mentioned above in the description of the configuration of the media sensor 100, the optical sensor 150 includes the light source 1501 and the line sensor 1502.

Figure 6A:
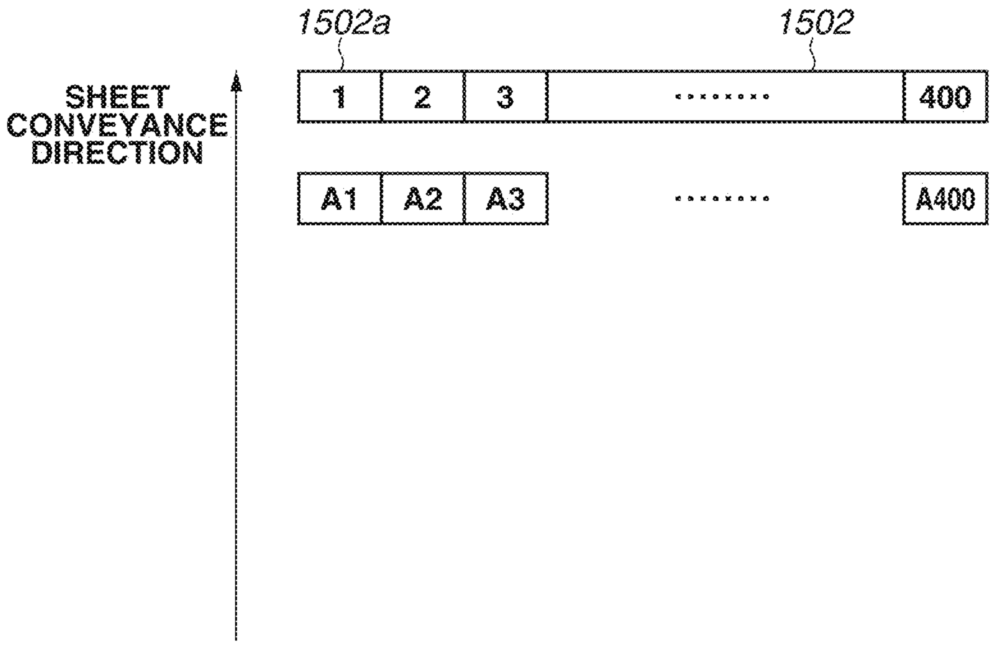
FIGS. 6A and 6B are each a diagram illustrating scanning by a line sensor.

Light emitted from the light source (LED) 1501 is refracted by a line guide (not illustrated) and thereafter hits the sheet P at a predetermined angle. Thereafter, the light reflected from the sheet P is received by the line sensor 1502 via a lens (not illustrated). This enables the line sensor 1502 to scan the light reflected from the sheet P as an image. FIG. 6A is an image diagram illustrating scanning by the line sensor 1502. As illustrated in FIG. 6A, image sensors 1502*a* of the line sensor 1502 are arranged at a pitch of 300 dpi in the direction orthogonal to the sheet conveyance direction. The image sensors 1502*a* of the line sensor 1502 are capable of capturing an image of 400 pixels (A1, A2, A3, . . . , A400) in the direction orthogonal to the sheet conveyance direction in a single capture.

The CIS can detect an image of only one line in a single scan, and a detection result of one line is not a sufficient amount of information for determining a surface characteristic of a sheet. This is because determining a surface characteristic based only on an image of one line in a sheet surface leads to increased variation in the output result for each detection position. In order to solve this, the line sensor 1502 performs image capturing of a plurality of lines on the sheet P being conveyed.

Figure 6B:
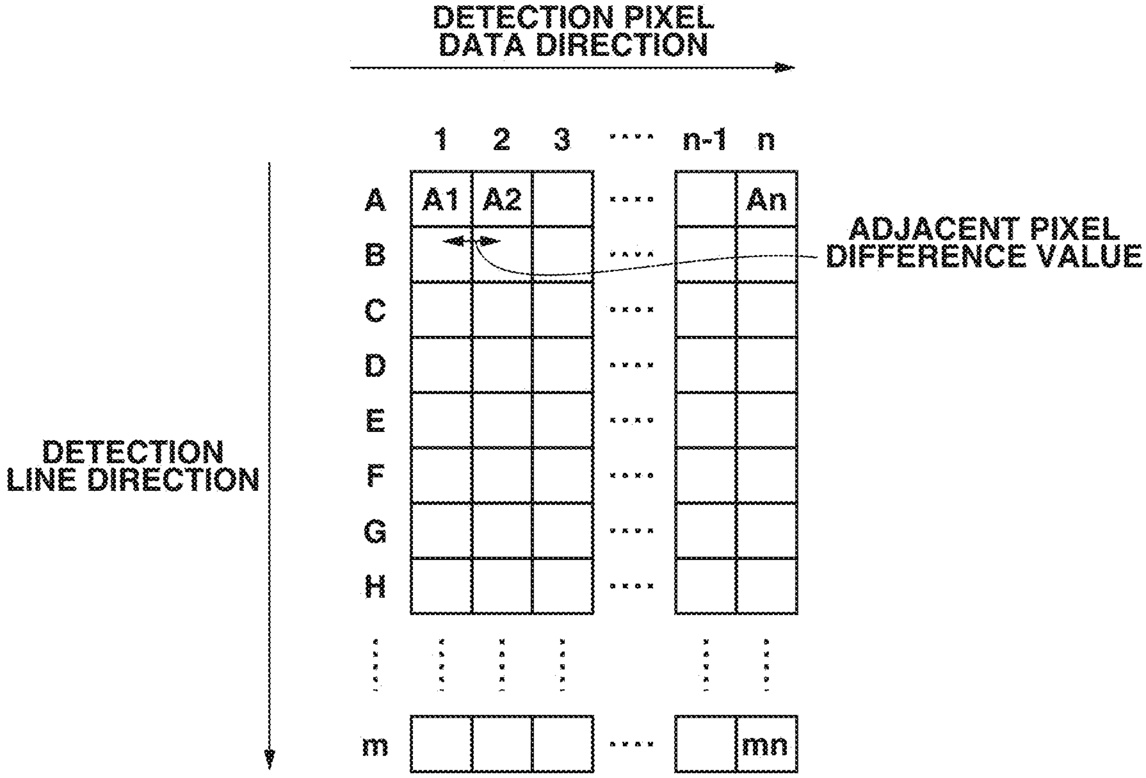

A cumulative adjacent pixel difference value is a value obtained by accumulating luminance differences between adjacent pixels of the line sensor 1502 and then summing the accumulated results of each line and is an index indicating the unevenness of the sheet. In FIG. 6B, the pixels are assigned numbers from 1 to n, and the detection lines are assigned numbers from A to n in detection line order. Then, a detection value of each pixel is indicated by a combination of a detection line name and a pixel number. In this case, a cumulative adjacent pixel difference value Y is expressed by equation (1) below using cumulative adjacent pixel difference values k of each line:

$$kA = (A2 - A1) + (A3 - A2) + \ldots \ldots + (An - An - 1),$$

$$kB = (B2 - B1) + (B3 - B2) + \ldots \ldots + (Bn - Bn - 1),$$

$$\ldots$$

$$\ldots$$

$$\ldots$$

$$km = (m2 - m1) + (m3 - m2) + \ldots \ldots + (mn - mn - 1),$$

$$Y = kA + kB + \ldots \ldots + km. \quad (1)$$

A detection pixel data direction in FIG. 6B is an array direction of the image sensors 1502*a* of the line sensor 1502. A detection line direction in FIG. 6B is the sheet conveyance direction.

A total luminance value is a value obtained by calculating a total value of luminance values of each pixel having received light in the line sensor 1502 and summing the total values of each detection line and indicates the brightness of the sheet. A total luminance value M is expressed by the following equation (2):

$$M = A1 + A2 + \ldots \ldots + B1 + B2 + \ldots \ldots + G1 + G2 + \ldots \ldots + mn. \quad (2)$$

A highly transparent film made of resin, such as polyethylene terephthalate (PET), reflects a small amount of light from the light source 1501, and the total luminance value is measured to be low. In a case where a sheet has a surface that is intentionally given a geometrically corrugated shape, such as embossed paper, adjacent pixels have great luminance differences due to the unevenness, so that the cumulative adjacent pixel difference value increases. Recycled paper is also uneven in its grain direction, and as pulp fibers become shorter through several recycling processes, the surface roughness becomes rougher, and the cumulative adjacent pixel difference value tends to increase. Coated paper, on the other hand, is less uneven due to a coating layer on its surface, so that the cumulative adjacent pixel difference value tends to decrease.

While the surface characteristic is determined using the cumulative adjacent pixel difference value according to the present exemplary embodiment, this is not intended to be a limitation. For example, an irradiation unit may irradiate light onto a surface of a sheet at a predetermined angle of incidence, and the surface characteristic of the sheet may be determined based on detection results of a first light receiving unit configured to detect diffuse reflected light from the sheet and a second light receiving unit configured to detect specular reflected light from the sheet. In general, a low-gloss sheet exhibits complete diffuse reflection characteristics whereas a high-gloss sheet exhibits reflection characteristics of a mixture of specular reflection and diffusion. The surface characteristic of a sheet can be detected by utilizing the fact that the reflection characteristics vary depending on the surface characteristic.

While the transparency of a sheet is determined using light reflected from the sheet according to the present exemplary embodiment, this is not intended to be a limitation. For example, an irradiation unit may irradiate light onto a surface of a sheet, and the transparency of the sheet may be determined based on a detection result of a light receiving unit configured to detect light transmitted through the sheet.

(Processes of Information Processing Unit)

The information processing unit 160 instructs the ultrasonic sensor 120 and the optical sensor 150 to perform detection and processes detection results of the ultrasonic sensor 120 and the optical sensor 150.

In a case where a sheet detection instruction is received from the control unit 400, the information processing unit 160 starts a detection sequence. Initially, the information processing unit 160 performs initialization processing on the ultrasonic sensor 120 and the optical sensor 150 to prepare for sheet detection. In the initialization processing, the information processing unit 160 retrieves initial setting values stored in the memory Z 1601 and sets the retrieved values. Thereafter, the information processing unit 160 causes the ultrasonic sensor 120 to perform ultrasound detection in a state where there is no sheet in the detectable area where a sheet is detectable. The information processing unit 160 stores, in the memory Z 1601, a result of an output voltage A generated by the ultrasonic sensor 120 in a state where there is no sheet in the detectable area. In a case where a conveyed sheet is detected by the sheet detection sensor 270, the information processing unit 160 causes the ultrasonic sensor 120 to perform ultrasound detection on the sheet having entered the detectable area of the ultrasonic sensor 120. The information processing unit 160 stores a result of an output voltage B generated by the ultrasonic sensor 120 in the memory Z 1601 and calculates the transmittance based on the output voltages A and B.

In response to the sheet detection sensor 270 detecting a conveyed sheet, the information processing unit 160 causes the optical sensor 150 to perform luminance value detection on the sheet having entered the detectable area of the optical sensor 150. The information processing unit 160 stores output values (luminance values) detected by the optical sensor 150 for each pixel in the memory Z 1601. Thereafter, the information processing unit 160 processes the output values detected by the optical sensor 150 and stores a total luminance value and a cumulative adjacent pixel difference value in the memory Z 1601 in the information processing unit 160.

Figure 7:
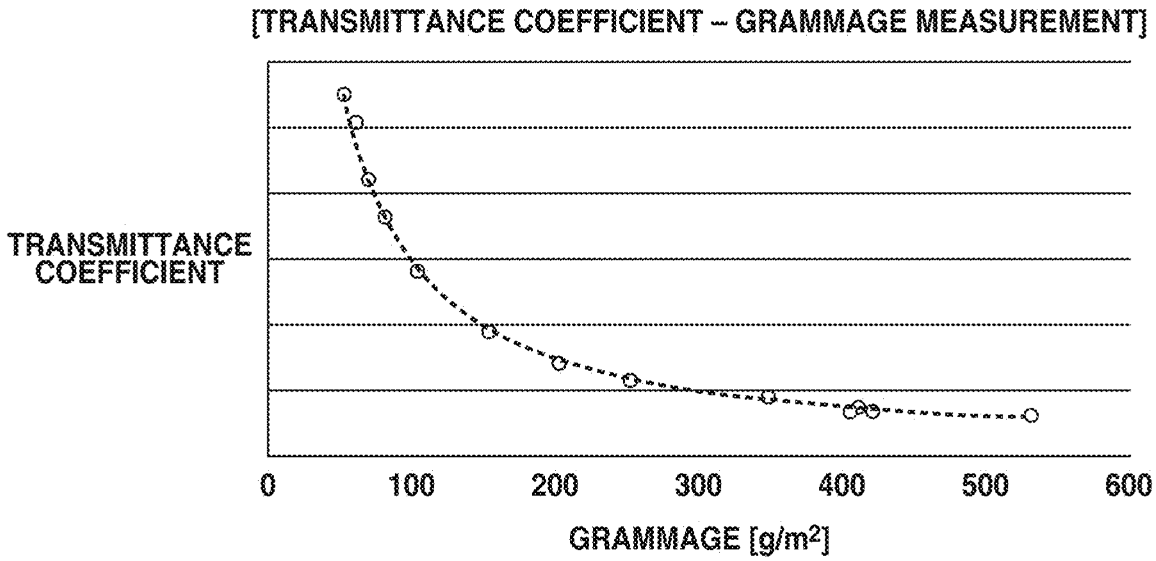
FIG. 7 is a diagram illustrating a transmittance coefficient-grammage relationship.

The information processing unit 160 converts the result of detection performed by the ultrasonic sensor 120 into a grammage and stores the grammage in the memory Z 1601 in the information processing unit 160. To convert the transmittance of the ultrasound into the grammage, the transmittance (transmittance coefficient) is calculated from the detection result in the absence of a sheet and the detection result in the presence of a sheet, and the grammage is calculated using the conversion formula between the transmittance coefficient of the ultrasound and the sheet grammage that corresponds to the diagram illustrated in FIG. 7.

After the grammage is calculated, the information processing unit 160 determines that all measurements are completed, and transmits the grammage, the cumulative adjacent pixel difference value, and the total luminance value to the control unit 400. As described below, the control unit 400 determines the sheet type based on the cumulative adjacent pixel difference value, the total luminance value, and a table corresponding to a matrix illustrated in FIG. 12.

(Expected Variation Range of Sheet)

Figure 8:
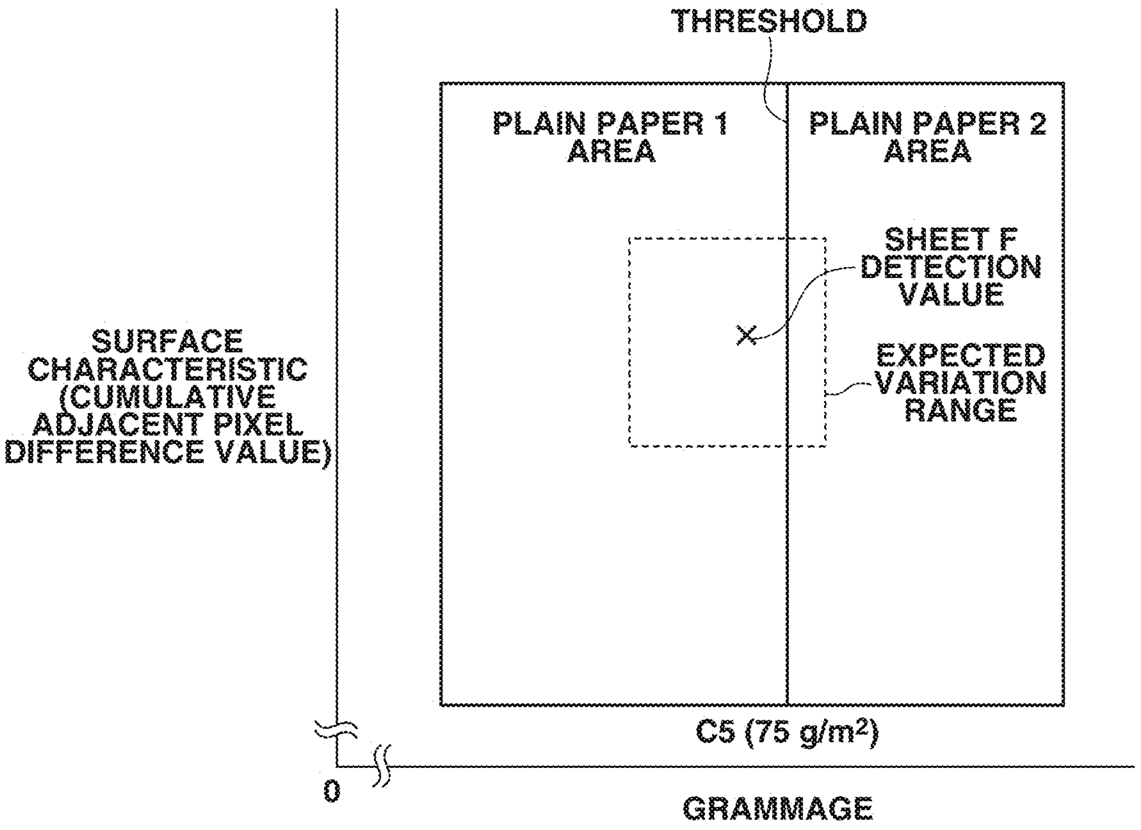
FIG. 8 is a diagram illustrating a relationship between a sheet F detection result and image forming modes.

FIG. 8 is a diagram illustrating how a result of detecting a sheet F by the media sensor 100, an expected variation range corresponding to the result, and a grammage threshold relate to each other.

The expected variation range refers to a range within which detection values may vary in view of variation factors, such as variation in sheets or sensor detection values or environmental effects. The expected variation range is calculated using calculation equations (equations (3) and (4)) that are set based on experimental results. Expected variation range Xa=detection value (grammage) of sheet F×(1±expected variation value of grammage) (3).

Expected variation range Ya=measurement value of sheet F (cumulative adjacent pixel difference value)×(1±expected variation value of cumulative adjacent pixel difference value) (4).

Equations (3) and (4) are stored in the memory 401, and the control unit 400 can calculate an expected variation range of a sheet based on a result of detection performed by the media sensor 100.

FIG. 8 is a diagram illustrating a case where most of the expected variation range of the sheet F is located in a plain paper 1 area and, therefore, the control unit 400 recommends an image forming mode of plain paper 1. However, a detection result of the media sensor 100 may be located in a plain paper 2 area due to the variation factors described above. In this case, the control unit 400 recommends not the image forming mode of plain paper 1 but an image forming mode of plain paper 2.

There may be a case where the image forming mode determination based on a result of detection performed by the media sensor 100 is used by a user to check whether the sheet detected by the media sensor 100 is correctly determined. In this case, if the user knows in advance that the image forming mode of the sheet F will not be plain paper 2, it is desirable for the user to determine that plain paper 1 is always a recommended image forming mode for the sheet F. According to the present exemplary embodiment, the user knowing that the image forming mode of the sheet F will not be plain paper 2 can set a threshold so that the recommended image forming mode for the sheet F is always plain paper 1.

(Manual Sheet Setting Mode and Sheet Determination Mode)

Figure 9:
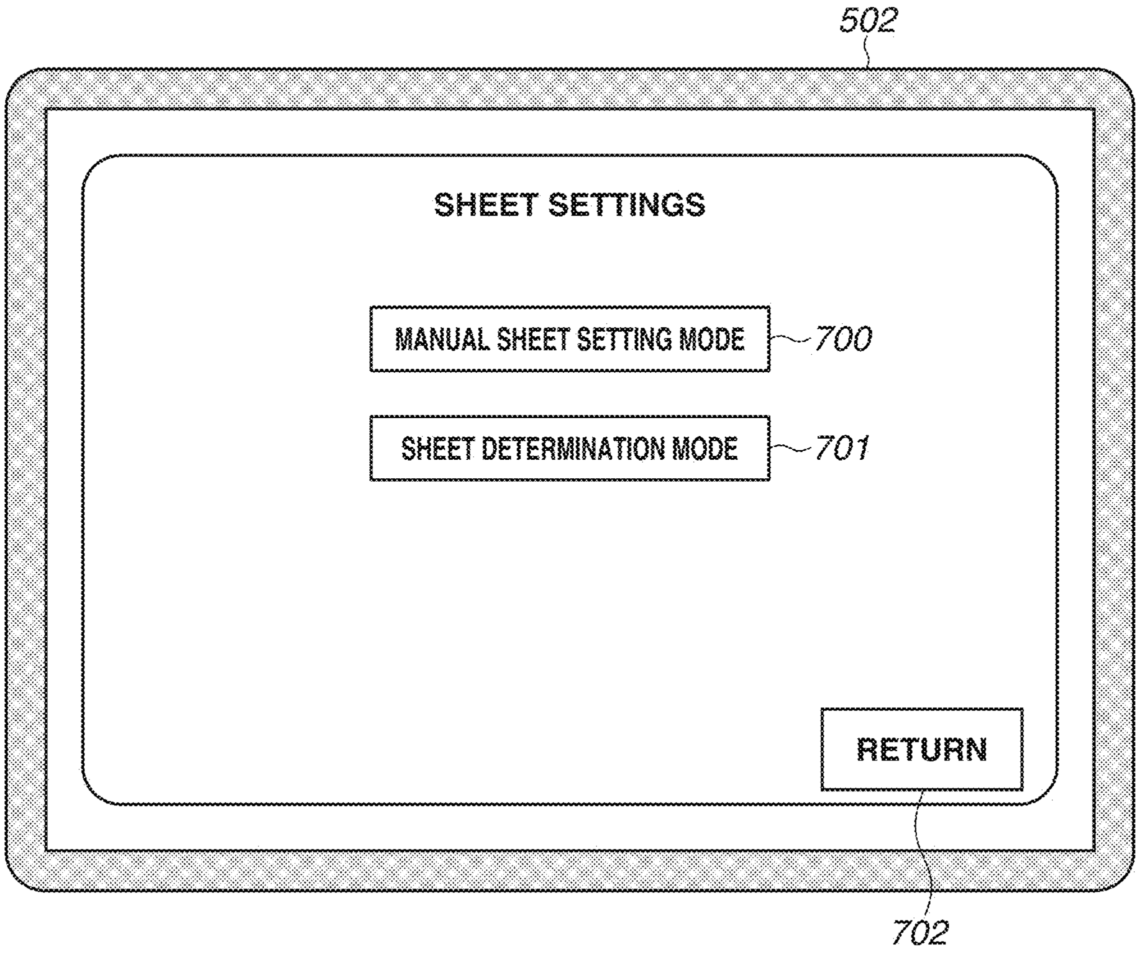
FIG. 9 is a diagram illustrating a display on a display (image forming mode setting).

FIG. 9 is a diagram illustrating the display 502 displaying a manual sheet setting mode key 700. The manual sheet setting mode key 700 is a key for selecting a manual sheet setting mode by the user. FIG. 9 is a diagram illustrating the display 502 displaying a sheet determination mode key 701 for executing the sheet determination based on the media sensor 100. The sheet determination mode key 701 is a key for selecting a sheet determination mode by the user.

From the state illustrated in FIG. 9, the user can select whether to set the manual sheet setting mode or the sheet determination mode. The manual sheet setting mode refers to a mode in which the user manually sets a sheet type and a grammage range. The user can manually configure the sheet settings. In a case where the user selects a sheet type and a grammage range, the control unit 400 sets an image forming mode corresponding to the selected sheet type and the selected grammage range. The image forming modes corresponding to each sheet type and each grammage range are stored in the image forming mode database 402.

The sheet determination mode refers to a mode in which the control unit 400 determines a sheet type and a grammage range based on sheet detection results of the media sensor 100.

The user can call a setting screen illustrated in FIG. 9 by operating the display 502.

In response to the user touching a key 702, the control unit 400 returns a screen of the display 502 to, for example, a home screen. Thus, the user can return the screen of the display 502 to the home screen by touching the key 702.

(Image Forming Mode Setting Sequence)

An image forming mode setting sequence will be described below with reference to FIG. 10.

Figure 10:
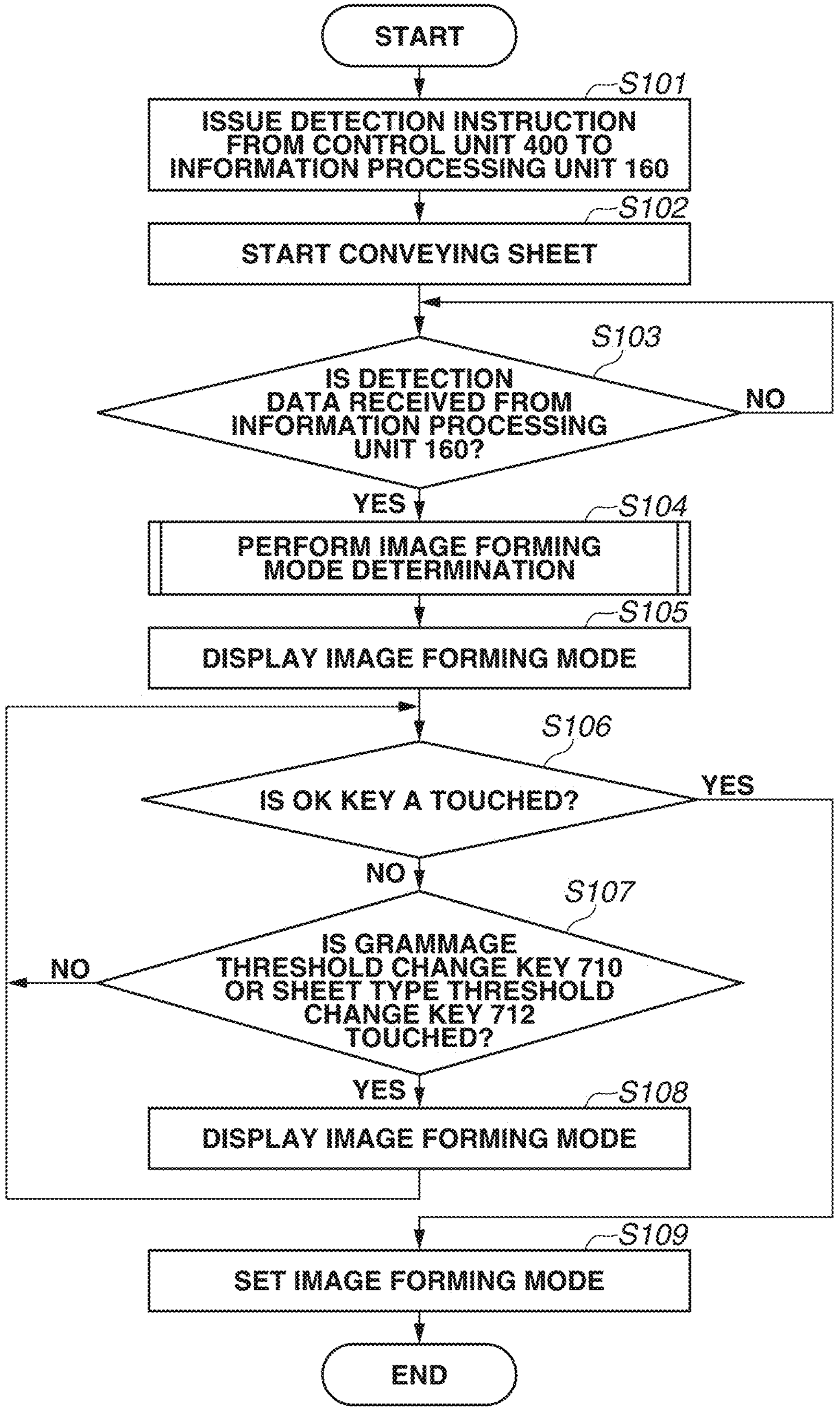
FIG. 10 is a flowchart illustrating a process of controlling measurements by the media sensor.

FIG. 10 is a flowchart that is executed by the control unit 400 in response to the user touching the sheet determination mode key 701 with the screen illustrated in FIG. 9 displayed on the display 502. A description is provided of the flowchart for a case where a sheet that is detected is the sheet F illustrated in FIG. 8.

In step S101, in response to the user touching the sheet determination mode key 701, the control unit 400 instructs the information processing unit 160 to perform sheet detection.

In step S102, the control unit 400 causes the conveying unit 600 to start conveying one sheet F from the manual feeding portion 235.

In step S103, the control unit 400 monitors whether detection data on the sheet F is received from the information processing unit 160, and if detection data is received (YES in step S103), the detection data on the sheet F is stored in the memory 401. The processing then proceeds to step S104. If no detection data is received (NO in step S103), the control unit 400 continues to monitor whether detection data is received. The detection data that is stored in the memory 401 is the cumulative adjacent pixel difference value, the total luminance value, and the grammage. The sheet started to be conveyed in step S102 is detected by the media sensor 100 and thereafter ejected to the stacking portion 223 by the conveying unit 600.

Figure 11:
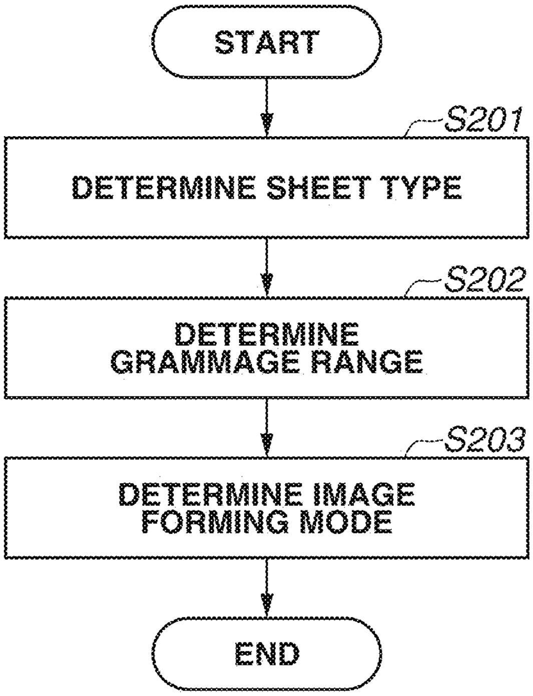
FIG. 11 is a flowchart illustrating an image forming mode determination process.

In step S104, the control unit 400 determines an image forming mode for the sheet F for which the detection data is stored in the memory 401. FIG. 11 is a flowchart illustrating the operation in step S104 (image forming mode determination) in FIG. 10. The flowchart in FIG. 11 will be described below.

In a case where the cumulative adjacent pixel difference value, the total luminance value, and the grammage are transmitted from the information processing unit 160, the control unit 400 starts the processing of step S201. In step S201, the control unit 400 calculates the expected variation range Ya based on the cumulative adjacent pixel difference value transmitted from the information processing unit 160. The control unit 400 determines the sheet type based on the expected variation range Ya, the total luminance value, and the table corresponding to the matrix in FIG. 12.

Figure 12:
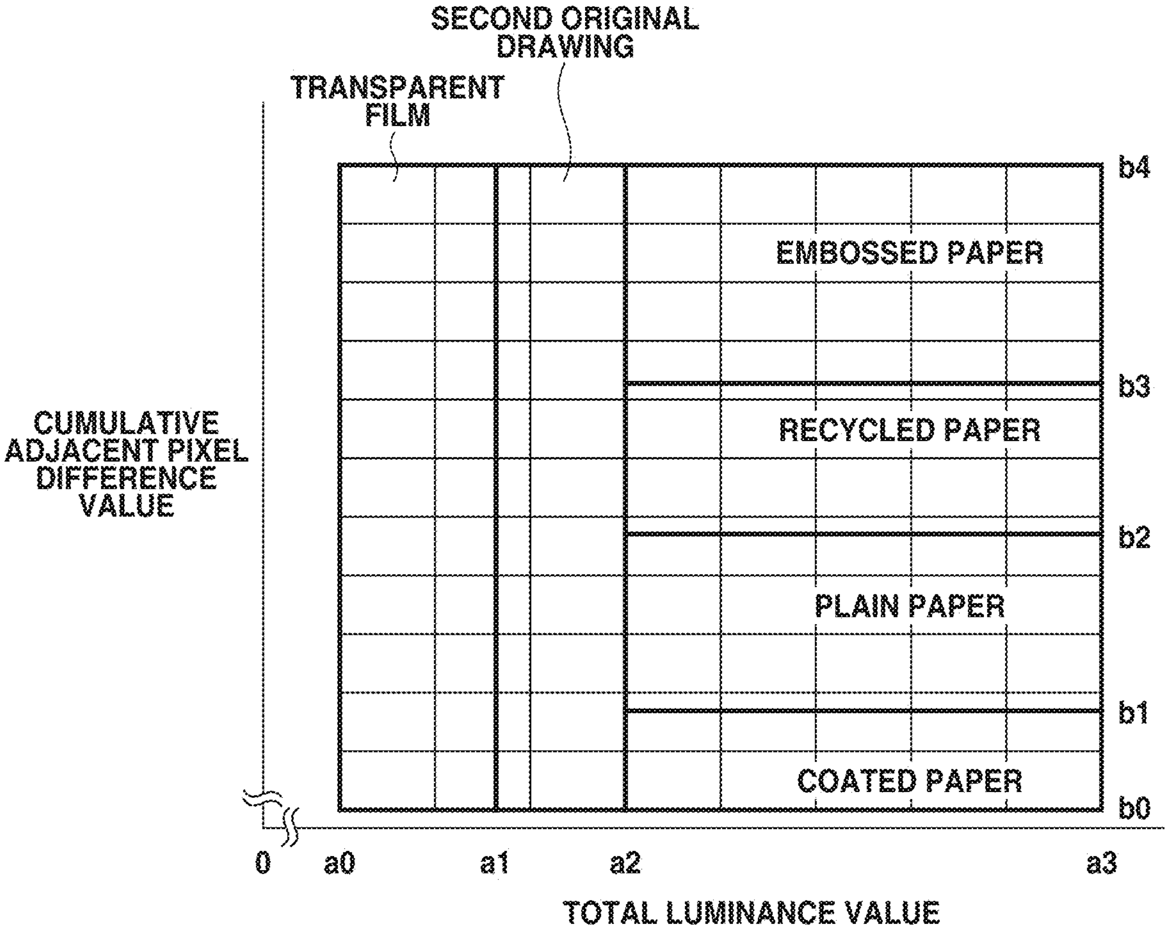
FIG. 12 is a diagram illustrating a surface characteristic classification matrix.

In the matrix in FIG. 12, a vertical axis represents cumulative adjacent pixel difference values, and a horizontal axis represents total luminance values. The control unit 400 determines which one of "transparent film", "second original drawing", "coated paper", "plain paper", "recycled paper", and "embossed paper" the sheet belongs to, based on the expected variation range Ya and the total luminance value. Information corresponding to the matrix in FIG. 12 is information determined in advance by experiment and the like, and this information is stored in the memory 401. In the memory 401, thresholds (a0 to a3 for the total luminance value, and b0 to b4 for the cumulative adjacent pixel difference value) for use in the determination by the control unit 400 are also stored. After the sheet type determination is performed by the control unit 400, the processing proceeds to step S202.

In step S202, the control unit 400 calculates an expected variation range Xa based on the grammage transmitted from the information processing unit 160. The control unit 400 determines which one of a plurality of grammage ranges illustrated in FIG. 13 the expected variation range Xa belongs to. The information in FIG. 13 is predetermined information, and this information is stored in the memory 401. Grammage range thresholds are indicated by c1 to c23, and each value is stored in the memory 401. FIG. 13 illustrates a relationship between information corresponding to the grammages and information corresponding to the sheet types and image forming mode names corresponding to the image forming modes. As in FIG. 12, "plain paper", "coated paper", "recycled paper", and "embossed paper" in FIG. 13 are in association with the cumulative adjacent pixel difference values and the total luminance values. In other words, according to the present exemplary embodiment, the cumulative adjacent pixel difference values, the total luminance values, and the grammages are in association with the image forming modes. After the control unit 400 performs the grammage range determination, the processing proceeds to step S203.

In step S203, the control unit 400 determines the image forming mode based on the sheet type determined in step S201, the grammage range determined in step S202, and the information in FIG. 13.

The image forming modes are stored in the image forming mode database 402. As illustrated in FIG. 13, the image forming modes include "thin paper 1 to 2", "plain paper 1 to 3", "thick paper 1 to 7", "coated paper 1 to 3", "recycled paper 1 to 3", and "embossed paper 1 to 8". After the control unit 400 determines the image forming mode in step S203, the processing in the flowchart in FIG. 11 is ended. After the control unit 400 determines the image forming mode, the processing proceeds to step S105.

Figure 14:
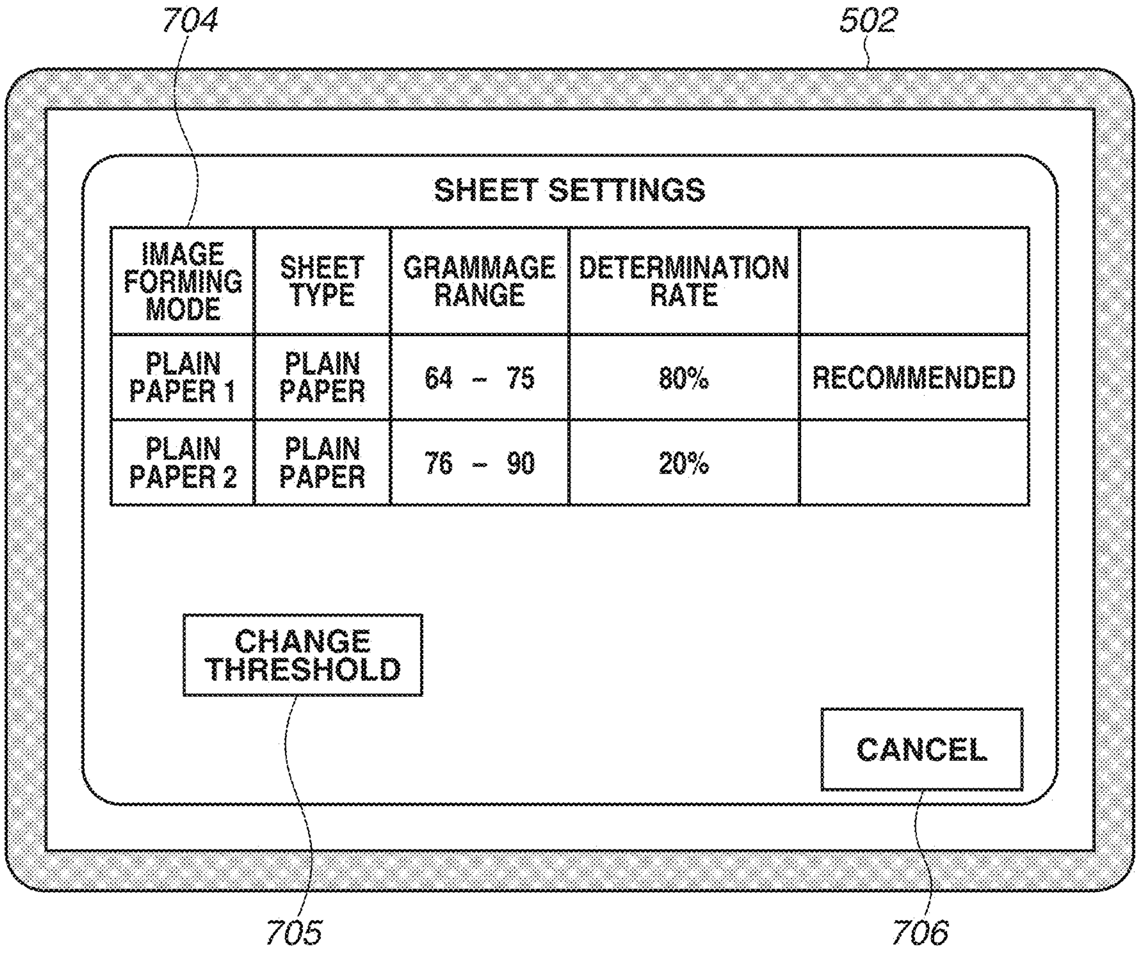
FIG. 14 is a diagram illustrating an example of a display on a display (candidate image forming mode display result).

In step S105, the control unit 400 displays, on the display 502, a determination result 704 on the image forming mode corresponding to the sheet F detected by the media sensor 100. Thus, the control unit 400 notifies the determination result 704 to the user. FIG. 14 illustrate an example of a notification screen displayed on the display 502 by the control unit 400 in step S105. FIG. 14 illustrate an example where a plurality of candidate image forming modes is displayed as the determination result 704 in step S105. In step S105, the control unit 400 displays the sheet types (sheet information, type information) and the grammage ranges (sheet information, grammage information) together with the image forming mode names (sheet information) on the display 502. After the control unit 400 displays the screen illustrated in FIG. 14 on the display 502, the processing proceeds to step S106.

The determination result 704 in FIG. 14 is a determination result in a case where the detection data on the sheet F that is received by the control unit 400 in step S103 is the sheet F detection value illustrated in FIG. 8. Determination rates included in the determination result 704 in FIG. 14 are determination rates in a case where the expected variation range of the detected sheet F is the range illustrated in FIG. 8. Each determination rate is expressed as a ratio between an area where an area of an expected variation range and an area of an image forming mode overlap and the area of the expected variation range. For example, in a case where the grammage range of plain paper 1 is 64 [$g/m^2$] to 75 [$g/m^2$] in FIG. 8, the area where the image forming mode of plain paper 1 and the area of the expected variation range of the sheet F overlap is 80% of the area of the expected variation range of the sheet F. Thus, in a case where the grammage range of the image forming mode of plain paper 1 is 64 [g/mˆ2] to 75 [g/mˆ2], the sheet F has an 80% chance of being a sheet that is to undergo image forming in the image forming mode for plain paper 1 in FIG. 14.

Furthermore, the screen illustrated in FIG. 14 indicates that the image forming mode determined to be recommended by the control unit 400 is plain paper 1. While the criteria for determining a recommended image forming mode by the control unit 400 are that the determination rate is 70% or higher and that it is the highest determination rate among the candidate image forming modes according to the present exemplary embodiment, they are not limiting criteria. For example, the criteria for determining a recommended image forming mode by the control unit 400 may be that the determination rate is 60% or higher. While the determination rate used as a criterion for determining a candidate image forming mode by the control unit 400 is 15% or higher according to the present exemplary embodiment, this is not intended to be a limitation. For example, the determination rate used as a criterion for determining a candidate image forming mode by the control unit 400 may be 20% or higher. In the display example in FIG. 14, the control unit 400 displays a plurality of image forming modes in descending order of determination rate from the top. While a plurality of image forming modes is displayed in descending order of determination rate from the top according to the present exemplary embodiment, this is not intended to be a limitation. For example, a plurality of image forming modes may be displayed in descending order of determination rate from the left. For example, a plurality of image forming modes may be displayed randomly regardless of their determination rates. However, displaying a plurality of image forming modes in descending order of determination rate produces an effect of improved visibility for the user, compared to displaying a plurality of image forming modes randomly regardless of their determination rates.

Figure 15:
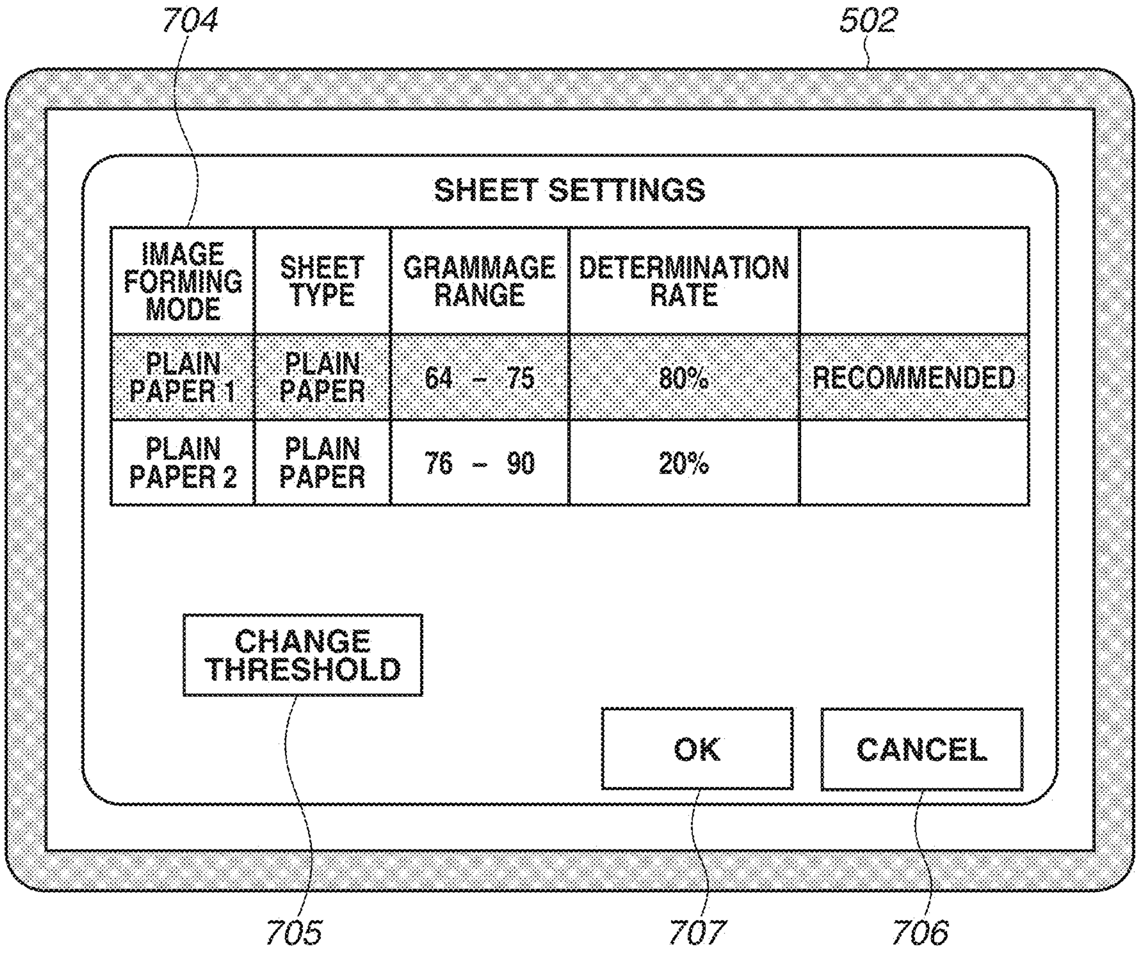
FIG. 15 is a diagram illustrating an example of a display on a display (screen with a candidate image forming mode selected).

The user can select an image forming mode by selecting one candidate 704 with a touch operation. FIG. 15 is a diagram illustrating a display example where the control unit 400 displays fields of one column of plain paper 1 in color and displays an OK key A 707 in response to the user touching the field of plain paper 1 as an input of an image forming mode. In a case where the OK key A 707 is touched by the user in a state where the screen illustrated in FIG. 15 is displayed on the display 502 (YES in step S106), the processing proceeds to step S109. In step S109, the control unit 400 sets the image forming mode selected by the user in step S106 to an image forming mode for forming images, and the process in the flowchart is ended. According to the present exemplary embodiment, the image forming mode setting performed by the control unit 400 in step S109 is also the sheet setting. In response to the user touching a cancel key 706, the control unit 400 ends the processing in FIG. 10 midway and returns the screen of the display 502 to, for example, the home screen. Thus, the user can end the sheet determination mode midway and return the screen of the display 502 to the home screen by touching the cancel key 706.

In step S106, if no touch operation has been performed on the OK key A 707 (NO in step S106), the processing proceeds to step S107. In step S107, if neither a grammage threshold change key 710 nor a sheet type threshold change key 712 has been touched by the user (NO in step S107), the processing proceeds to step S106. The control unit 400 repeats transitions between steps S106 and S107 until the OK key A 707, the grammage threshold change key 710, or the sheet type threshold change key 712 is operated by the user.

Figure 16:
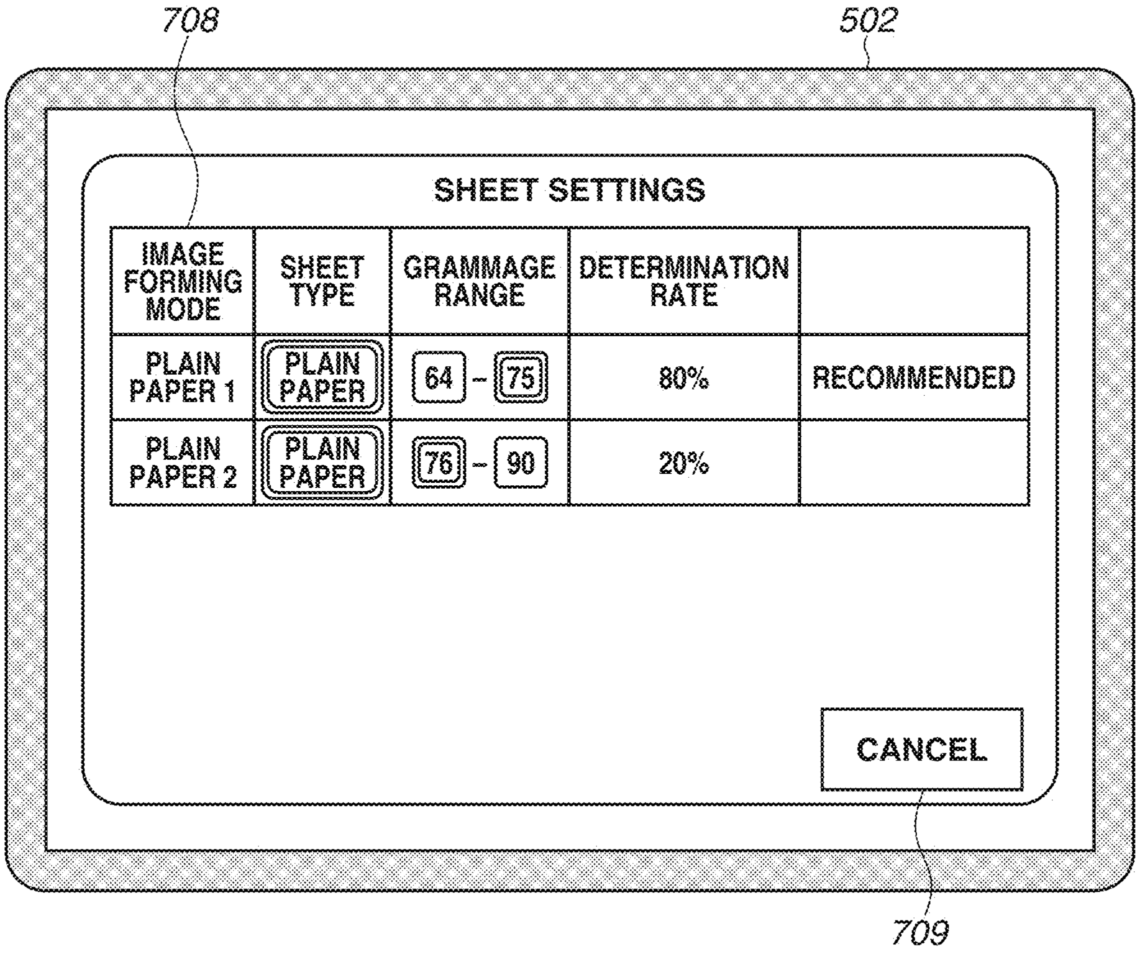
FIG. 16 is a diagram illustrating an example of a display on a display (introduction screen for threshold change).

The control unit 400 displays a screen of FIG. 16 on the display 502 in a case where a change threshold key 705 is touched by the user while the display in FIG. 14 or 15 is displayed on the display 502. FIG. 16 illustrates a display example where rounded rectangular keys for changing the threshold settings are displayed in a field of a candidate image forming mode 708. The user operates the rounded rectangular keys to change a grammage threshold and a sheet type threshold that the control unit 400 uses in determining a candidate image forming mode. The user touches a rounded rectangular key illustrated in FIG. 16 to change the threshold corresponding to the touched portion. In FIG. 16, keys labeled "plain paper" surrounded by a rounded rectangle of double solid lines are used by the user to change the thresholds for the sheet type determination to be performed by the control unit 400. The reason the keys labeled "plain paper" are outlined with double solid lines in FIG. 16 is to make it easier for the user to recognize that the sheet types for two candidate image forming modes (plain paper 1 and plain paper 2) are the same. The double solid lines of the keys indicate that in a case where one of the keys labeled "plain paper" is selected by the user and the threshold is changed, the other threshold is also changed correspondingly. In FIG. 16, keys labeled "75" and "76" among the numerical values of the grammage range are outlined with double solid lines, and this indicates that in a case where one of the keys labeled "75" and "76" is selected by the user and the threshold is changed, the other threshold is also changed correspondingly.

Figure 17:
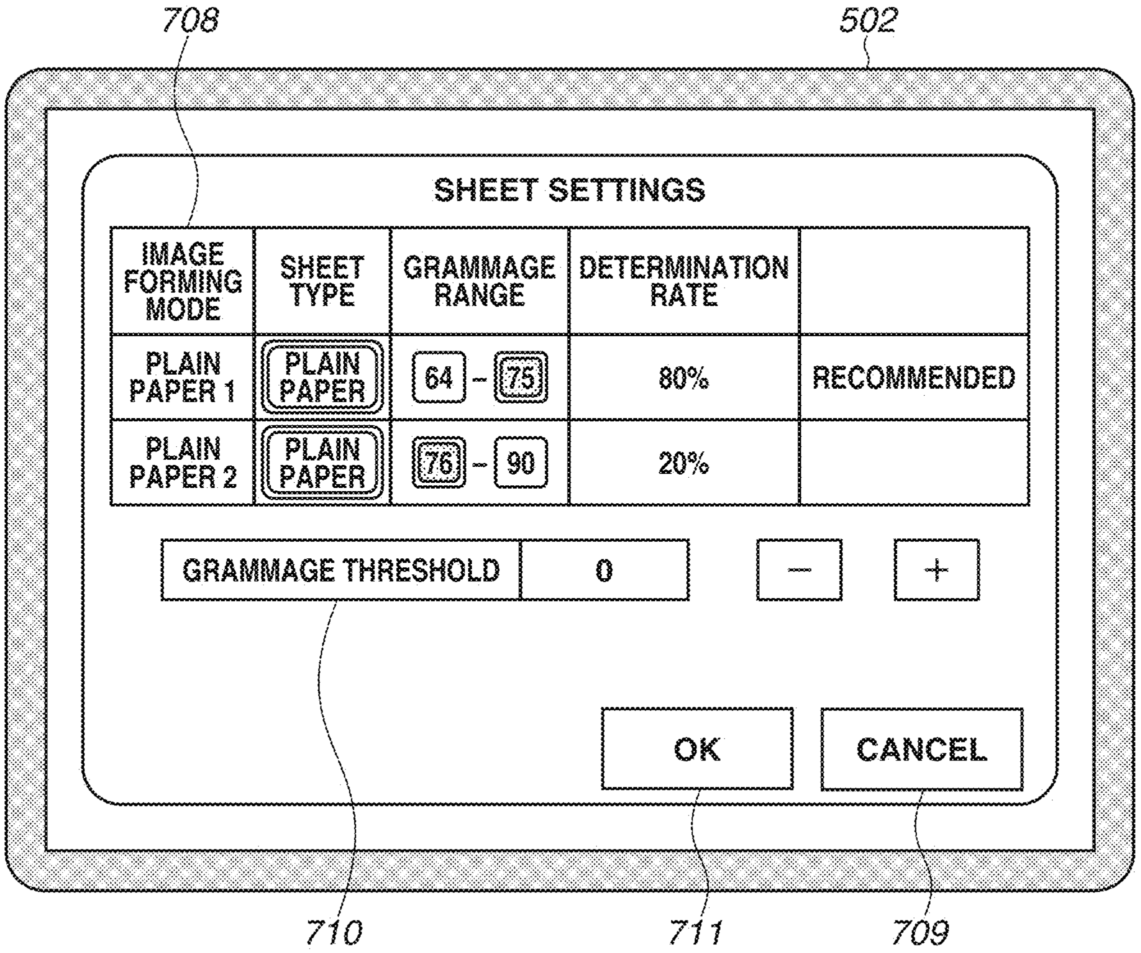
FIG. 17 is a diagram illustrating an example of a display on a display (threshold change screen).

FIG. 17 illustrates a display example of a screen that the control unit 400 displays on the display 502 in response to the user touching the key labeled "75" on the screen illustrated in FIG. 16. As illustrated in FIG. 17, the control unit 400 displays the keys labeled "75" and "76" in color and displays the grammage threshold change key 710. On the screen illustrated in FIG. 17, "75" and "76" among the numerical values of the grammage range are adjacent numerical values and, therefore, have a relationship with each other. Thus, the control unit 400 displays the same screen as that in FIG. 17 on the display 502 also in a case where the key labeled "76" is touched by the user.

Figure 18:
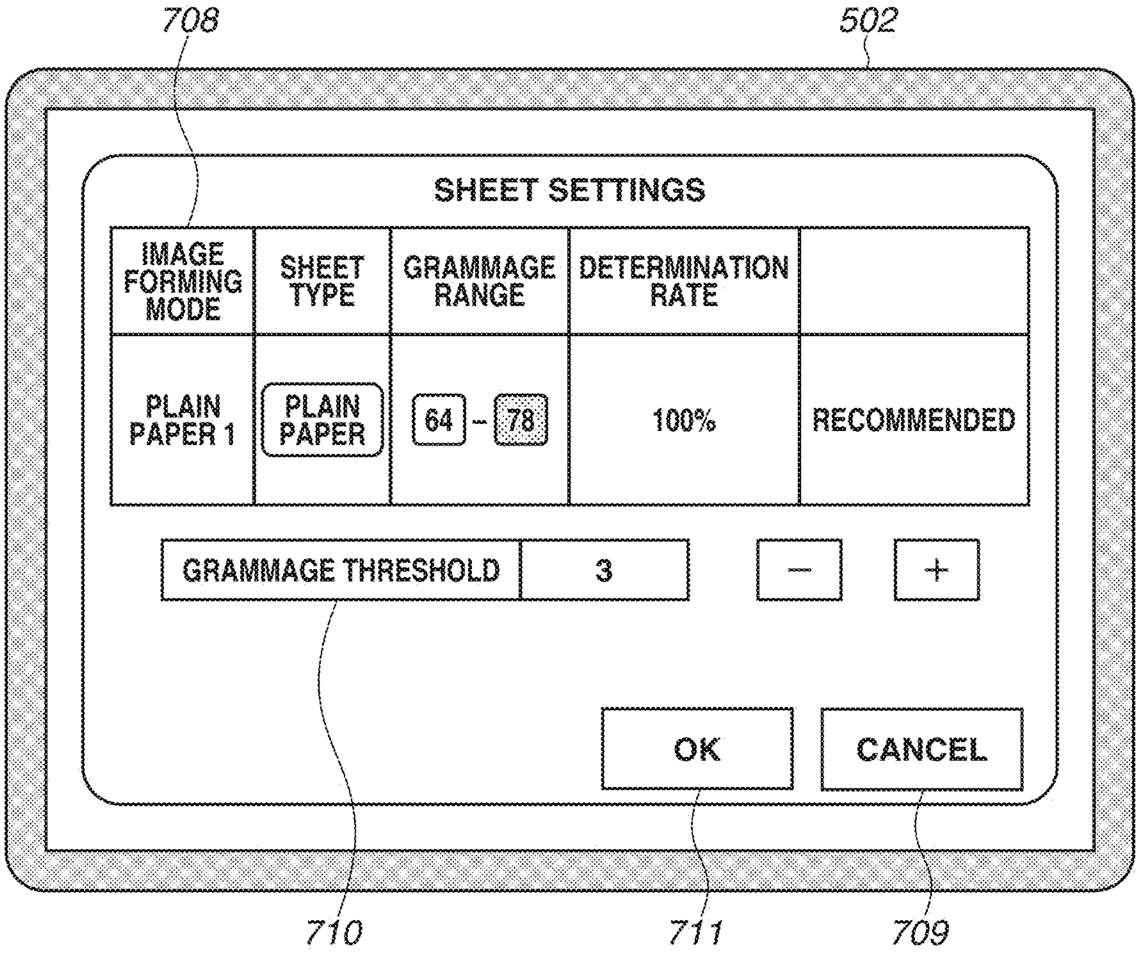
FIG. 18 is a diagram illustrating an example of a display on a display (threshold change screen).
Figure 19A:
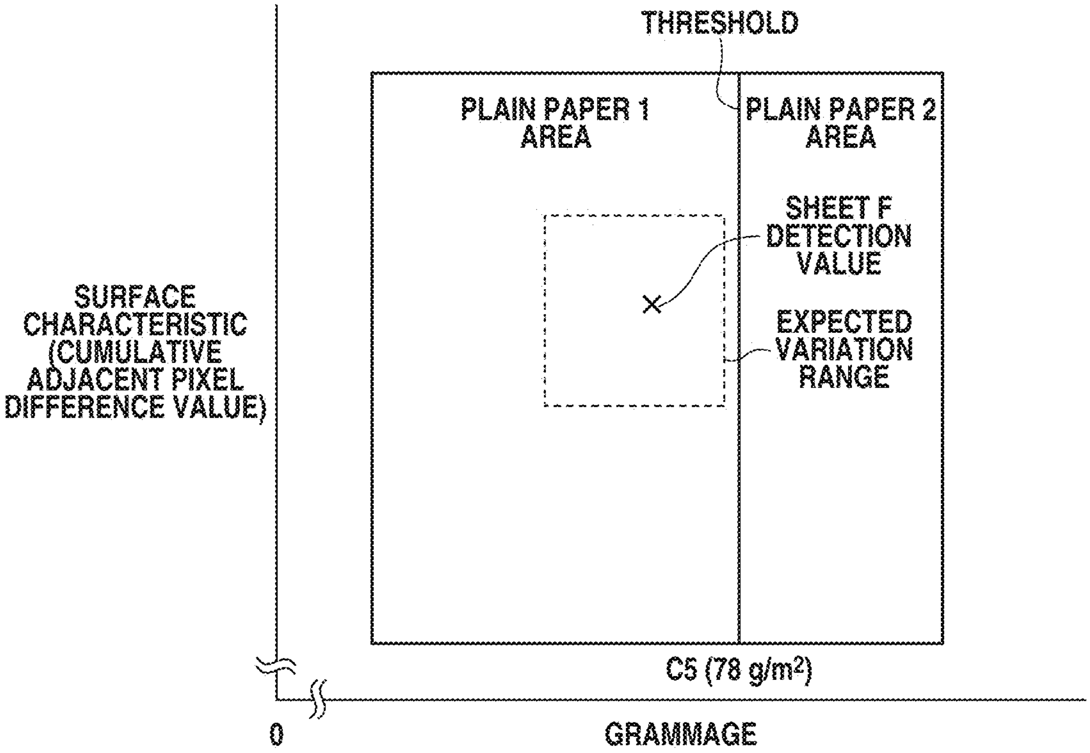
FIGS. 19A and 19B are each a diagram illustrating a relationship between a sheet F detection result and image forming modes.

In a case where the screen illustrated in FIG. 17 is displayed on the display 502 and the user touches a key labeled "+" of the grammage threshold change key 710 serving as an operation unit three times (YES in step S107), the processing proceeds to step S108. In step S108, the control unit 400 displays a screen illustrated in FIG. 18 on the display 502. The screen illustrated in FIG. 18 indicates that the display of the grammage threshold is changed from 0 to 3 as a result of touching the key labeled "+" three times. The threshold "0" indicates that the value is the same as a reference value stored in the memory 401. The control unit 400 performs image forming mode determination and determination rate determination based on the expected variation range corresponding to the detection data (detection data on the sheet F) stored in the memory 401 and the changed threshold. FIG. 18 illustrates a display example indicating that only plain paper 1 is displayed in the candidate image forming mode 708 as a result of changing the display of the grammage threshold in the grammage threshold change key 710 from 0 to 3 by a user operation. Thus, as illustrated in FIG. 19A, in a case where the expected grammage range of the sheet on which image forming is to be performed using the image forming mode of plain paper 1 is 64 [g/mˆ2] to 78

[g/m^2], the expected variation range of the sheet F is entirely included in the plain paper 1 area. The control unit 400 displays 100% as the determination rate for the image forming mode of plain paper 1 as in the diagram in FIG. 18. On the contrary, the expected variation range of the sheet F does not overlap with the plain paper 2 area in FIG. 19A. Thus, as in the diagram in FIG. 18, the control unit 400 does not display plain paper 2, which is an image forming mode with the determination rate less than 15%. This enables the user to check how the image forming mode for the sheet F is determined as a result of changing the grammage threshold. The user can check the sheet F determination result after changing the threshold without causing the media sensor 100 to perform detection on the sheet again. The user can check how the determination rate of the image forming mode corresponding to the sheet F is affected as a result of changing the grammage threshold. Furthermore, displaying both the grammage threshold change key 710 and the candidate 708 as a determination result on the display 502 by the control unit 400 produces an advantage for the user that the user can check the determination result while changing the threshold.

Figure 20:
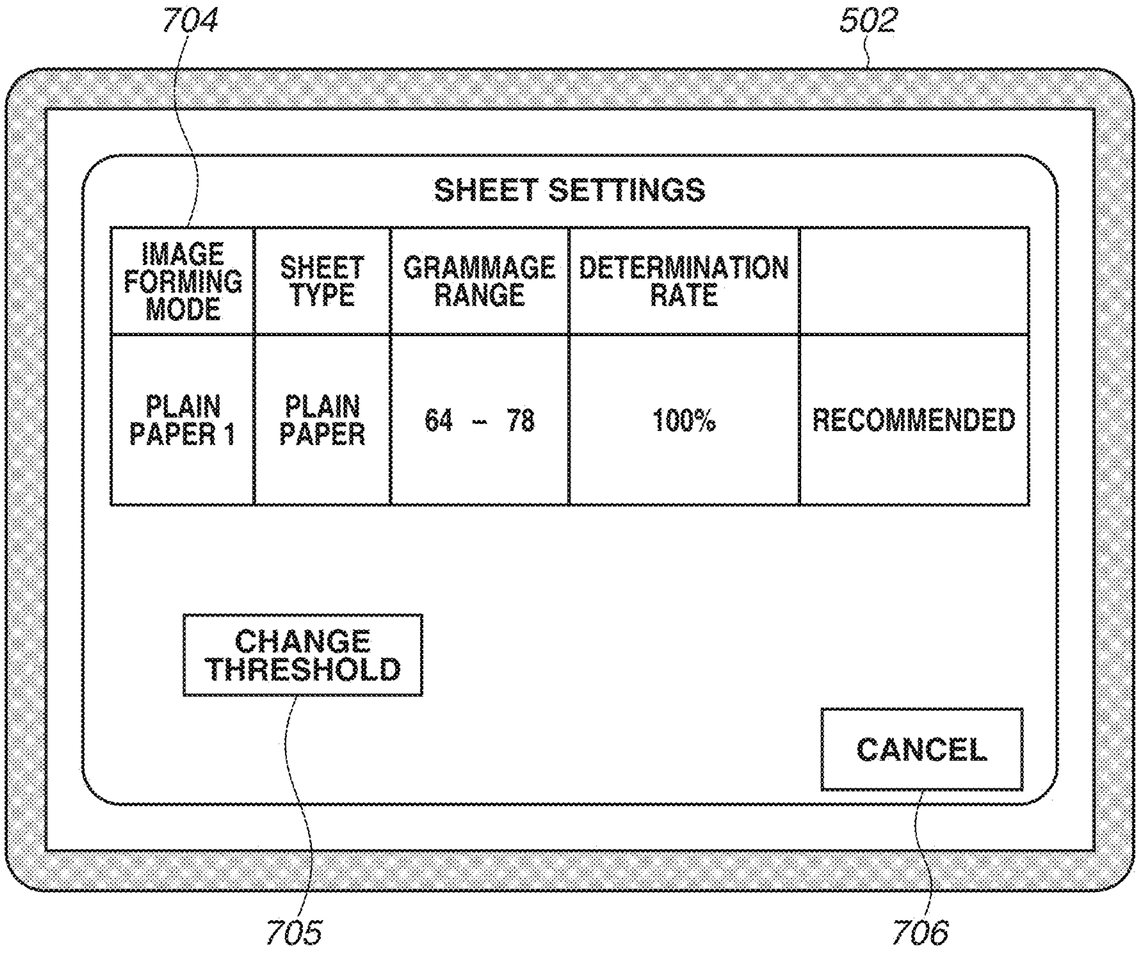
FIG. 20 is a diagram illustrating an example of a display on a display (candidate image forming mode display result).
Figure 21:
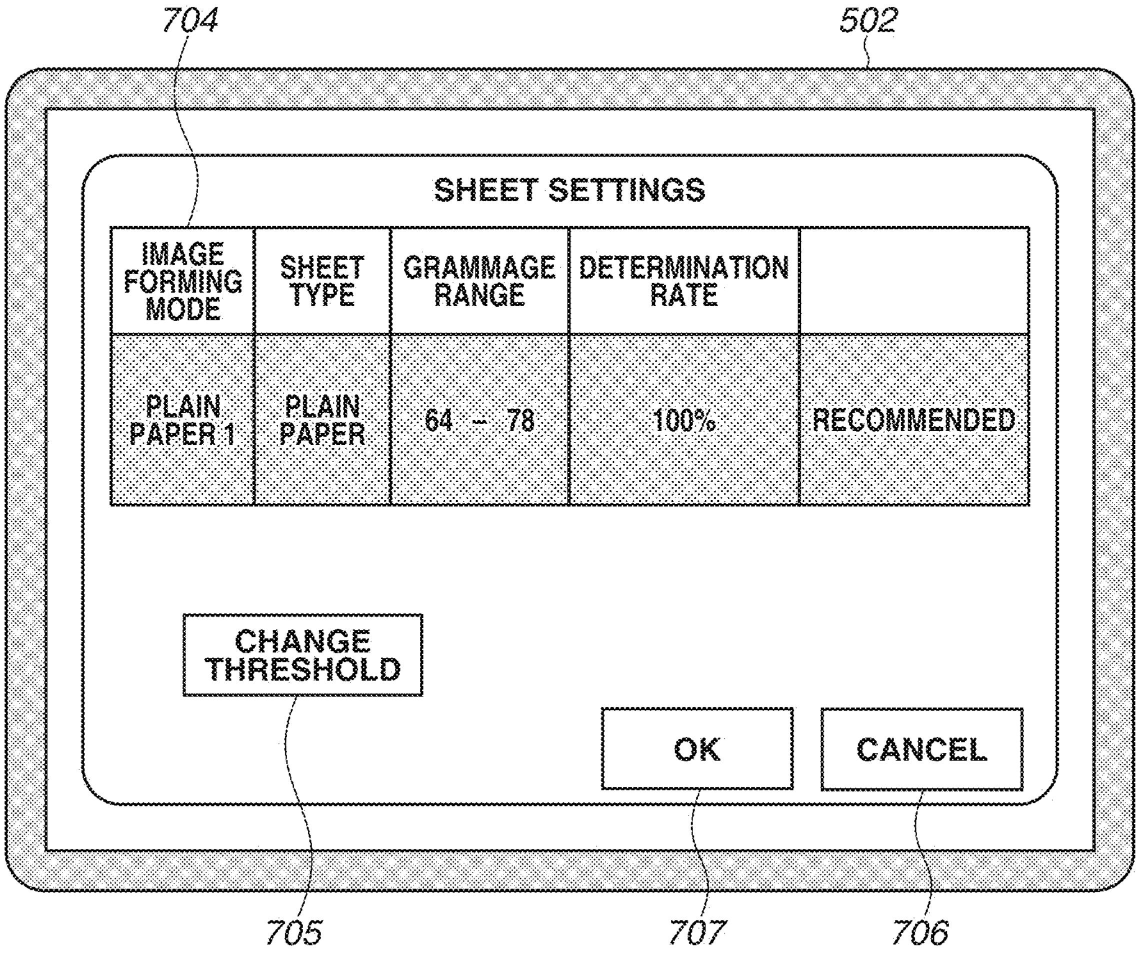
FIG. 21 is a diagram illustrating an example of a display on a display (screen with a candidate image forming mode selected).

The control unit 400 displays a screen illustrated in FIG. 20 on the display 502 in response to the user touching an OK key B 711 on the screen illustrated in FIG. 18. FIG. 20 illustrates an example where the candidate image forming mode is displayed on the display 502. The control unit 400 displays the field of plain paper 1 in color as in a screen illustrated in FIG. 21 in response to the user touching the field of plain paper 1 in the determination result 704 on the screen illustrated in FIG. 20. FIG. 21 illustrates a screen example in a case where the candidate image forming mode displayed on the display 502 is selected by the user. Furthermore, the control unit 400 displays the OK key A 707. In response to the user selecting the OK key A 707 in the screen state in FIG. 21 (YES in step S106), the processing proceeds to step S109. In step S109, the control unit 400 sets the selected image forming mode, and the process in the flowchart is ended.

In response to the user touching a cancel key 709, the control unit 400 ends the processing in FIG. 10 midway and returns the screen of the display 502 to, for example, the home screen. Thus, the user can end the sheet determination mode midway and return the screen of the display 502 to the home screen by touching the cancel key 709.

Figure 22:
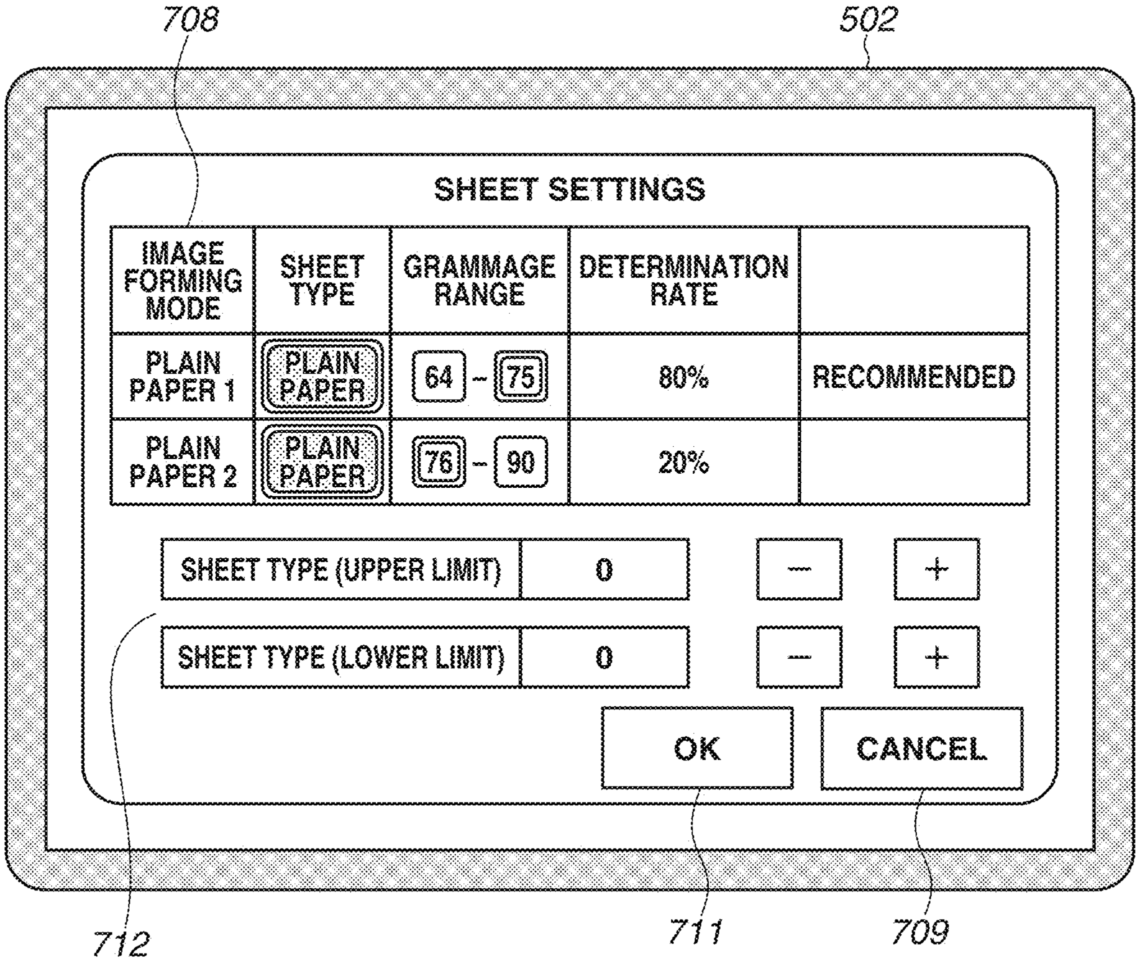
FIG. 22 is a diagram illustrating an example of a display on a display (threshold change screen).

The user can display the screen illustrated in FIG. 16 on the display 502 by touching the change threshold key 705 in a state where the screen illustrated in FIG. 14 or 15 is displayed on the display 502. The user can change the sheet type threshold by operating the screen illustrated in FIG. 16. According to the present exemplary embodiment, the sheet type thresholds are b0, b1, b2, b3, and b4 in FIG. 12. The control unit 400 displays a screen illustrated in FIG. 22 on the display 502 in response to the user touching the rounded rectangular key labeled "plain paper" displayed in the field of the candidate 708 in a state where the screen illustrated in FIG. 16 is displayed on the display 502. FIG. 22 illustrates a screen example in a case where a threshold change screen is displayed on the display 502. In a case where the screen illustrated in FIG. 22 is displayed on the display 502 and a key labeled "+" displayed in a field of "sheet type (upper limit)" in the sheet type threshold change key 712 serving as an operation unit is touched twice by the user, the control unit 400 displays a screen illustrated in FIG. 23 on the display 502.

Figure 23:
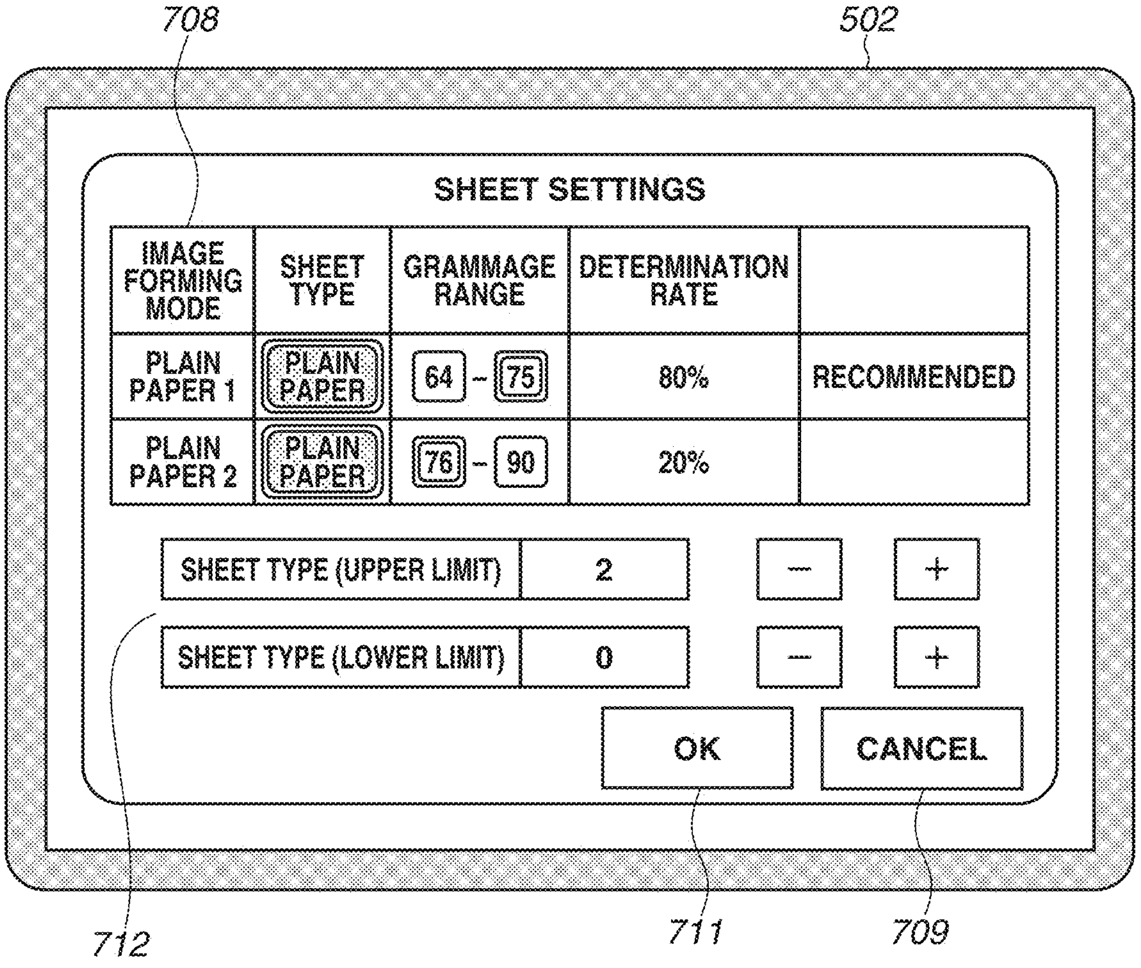
FIG. 23 is a diagram illustrating an example of a display on a display (threshold change screen).

FIG. 23 illustrates a screen example in a case where the threshold change screen is displayed on the display 502. FIG. 23 indicates that the upper limit of the threshold for plain paper is increased by 2. However, although the upper limit of the threshold for plain paper is increased by 2, there is no change in the result of sheet type determination on the sheet F by the control unit 400, so that the sheet type in the screen illustrated in FIG. 23 remains plain paper.

Figure 24:
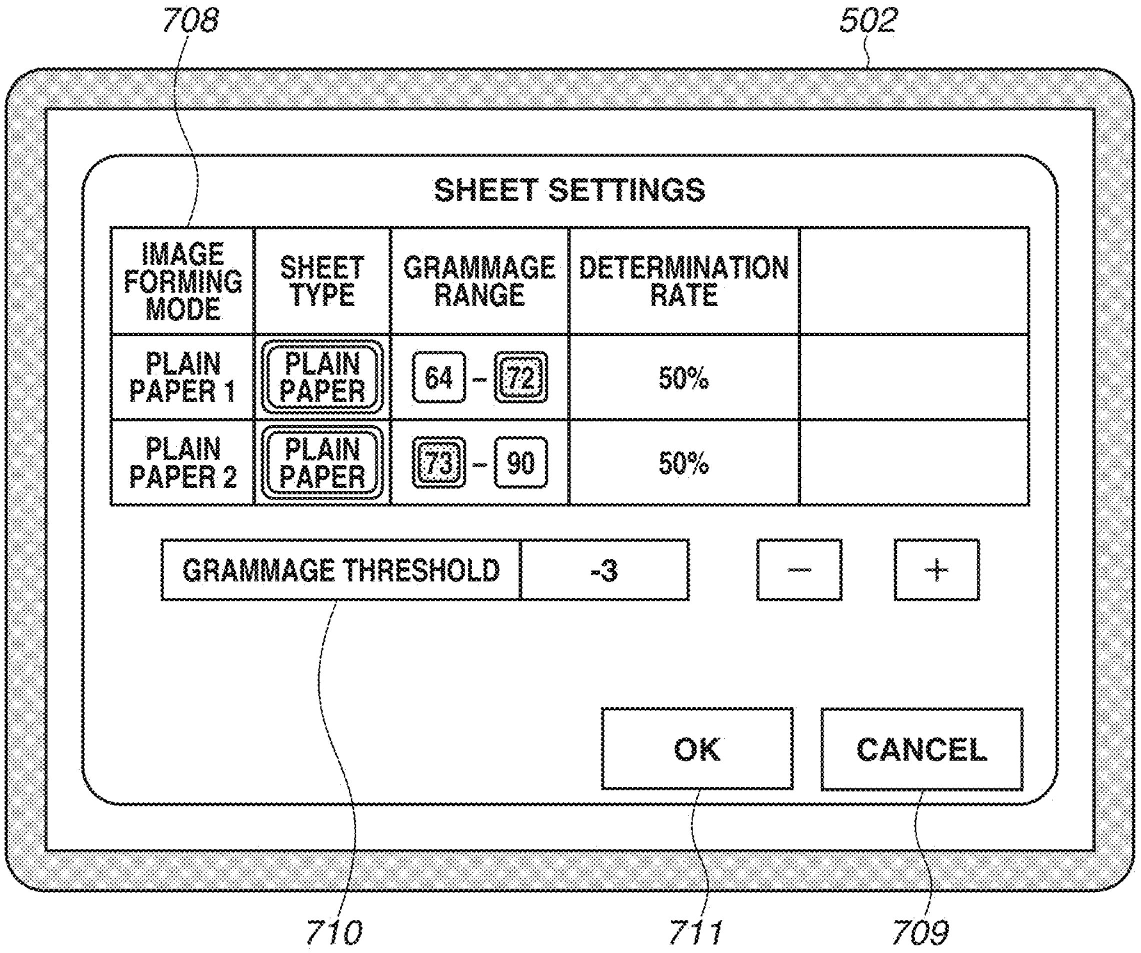
FIG. 24 is a diagram illustrating an example of a display on a display (threshold change screen).

In a case where the screen illustrated in FIG. 17 is displayed on the display 502 and a key labeled "–" displayed in the field of the grammage threshold change key 710 is touched three times by the user, the control unit 400 displays a screen illustrated in FIG. 24 on the display 502. FIG. 24 illustrates a screen example in a case where the threshold change screen is displayed on the display 502. The screen in FIG. 24 indicates that the display of the grammage threshold is changed from 0 to –3 as a result of touching the key labeled "–" three times by the user. FIG. 24 indicates that the determination rates of plain paper 1 (image forming mode) and plain paper 2 (image forming mode) are each changed to 50% as a result of the grammage threshold operation by the user.

Figure 19B:
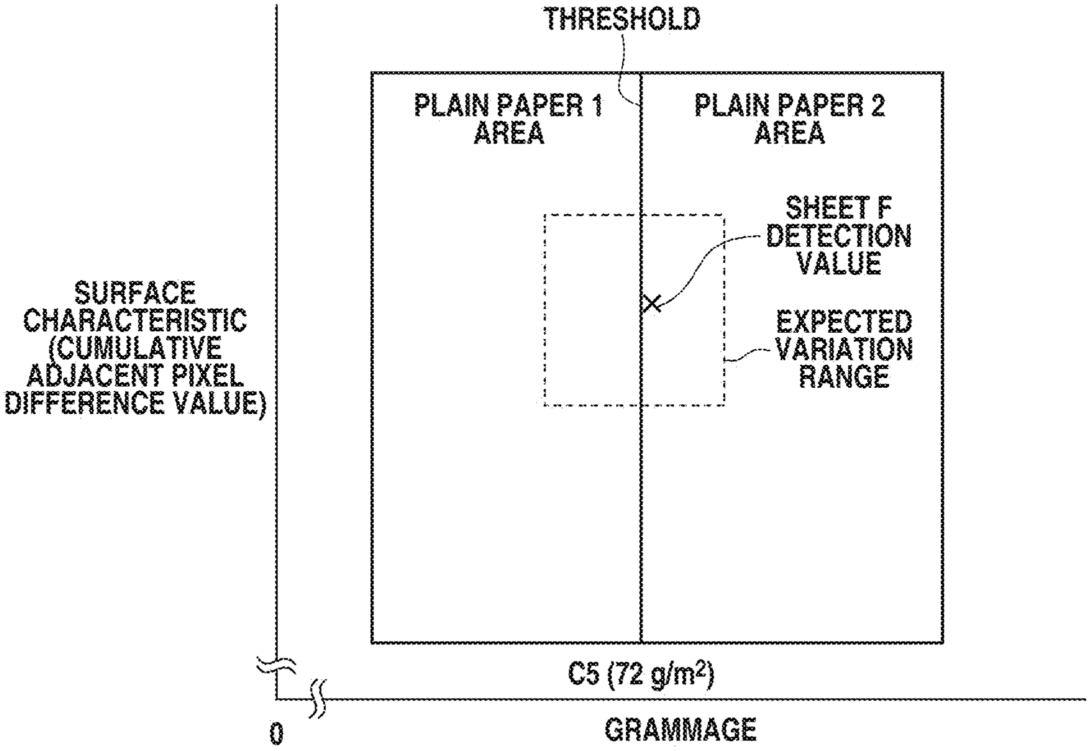

In a case where the expected grammage of the sheet on which image forming is to be performed in the image forming mode for plain paper 1 becomes 64 g/m^2 to 72 g/m^2 as a result of changing the threshold, 50% of the expected variation range of the sheet F is included in the plain paper 1 area in FIG. 19B. As a result, 50% is displayed as the determination rate of plain paper 1 for the image forming mode and the determination rate of plain paper 2 for the image forming mode on the screen illustrated in FIG. 24.

Figure 25:
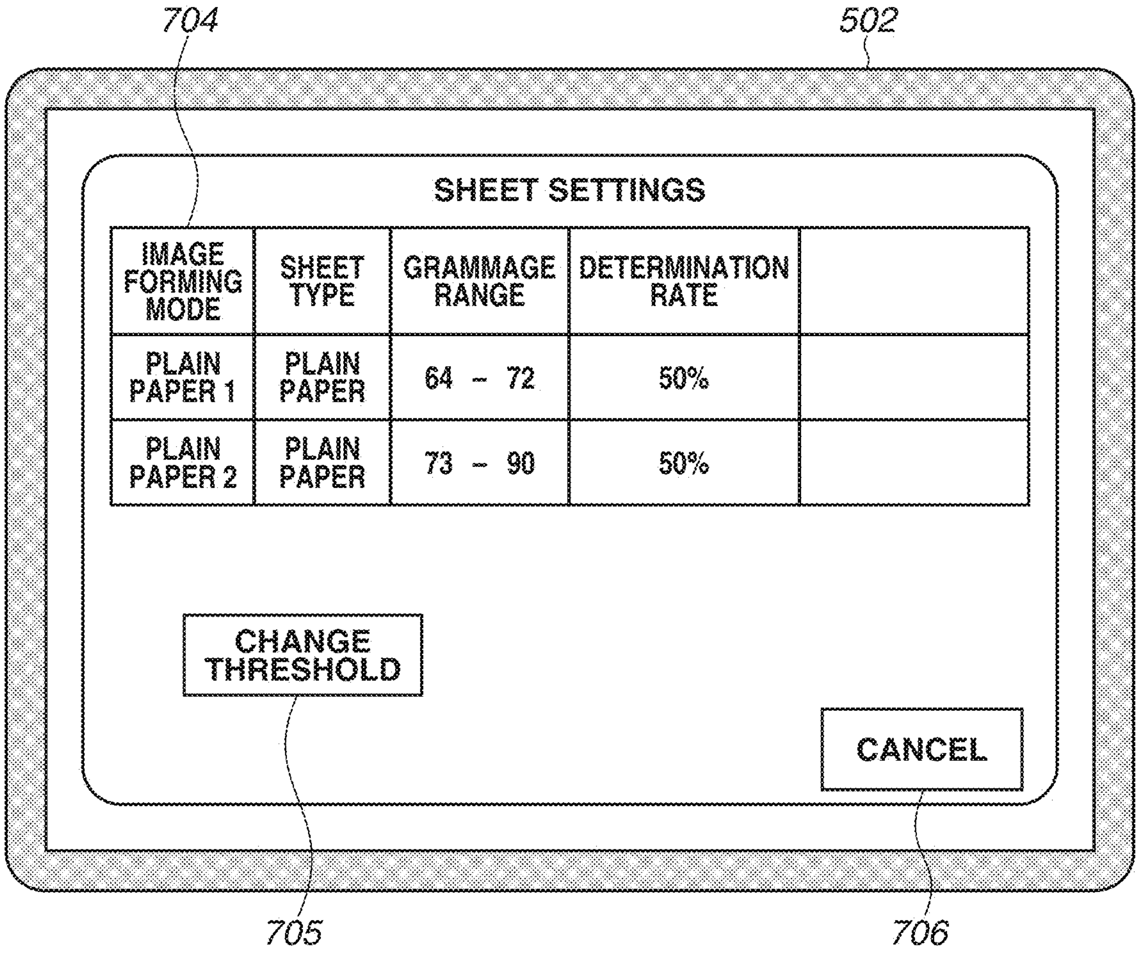
FIG. 25 is a diagram illustrating an example of a display on a display (candidate image forming mode display result).

In a case where the screen illustrated in FIG. 24 is displayed on the display 502 and the OK key B 711 is touched by the user, the control unit 400 displays a screen illustrated in FIG. 25 on the display 502. FIG. 25 illustrates an example where candidate image forming modes are displayed on the display 502.

In the screen state illustrated in FIG. 25, the user can select one image forming mode from the fields of the determination result 704.

While FIGS. 14, 15, 16, 17, 18, 20, 21, 22, 23, 24, and 25 illustrate examples of display results where the sheet type, the grammage range, and the image forming mode name are displayed, these are not limiting examples.

For example, the sheet type and the grammage range may be displayed as display items without display of the image forming mode name.

For example, the sheet type may be displayed as a display item without display of the grammage range and the image forming mode name.

For example, the grammage range may be displayed as a display item without display of the sheet type and the image forming mode name.

For example, the image forming mode name may be displayed as a display item without display of the sheet type and the grammage range.

As described above, regarding the sheet determination process of the media sensor 100, the function that enables the user to change the thresholds and the function of displaying the determination rates after the thresholds are changed are included, and this enables the user to set appropriate parameters for the threshold settings, according to the present exemplary embodiment. Furthermore, according to the present exemplary embodiment, it is unnecessary for the media sensor 100 to perform sheet detection again after the user changes the thresholds, and this reduces the inconvenience for the user.

Regarding changes to the grammage threshold, while the user can change a grammage threshold at a position selected by the user according to the present exemplary embodiment, this is not intended to be a limitation. A plurality of thresholds may be changed uniformly toward the positive side or toward the negative side.

Regarding changes to the sheet type threshold, while the user can change a sheet type threshold at a position selected by the user as described above, this is not intended to be a limitation. A plurality of thresholds may be changed uniformly toward the positive side or toward the negative side.

Regarding changes to the thresholds, while the control unit 400 displays the threshold change screen on the display 502 in a case where the media sensor 100 is caused to perform sheet detection according to the present exemplary embodiment, this is not intended to be a limitation. In addition to the threshold change method according to the present exemplary embodiment, the control unit 400 may display the threshold change screen on the display 502 based on a user operation to receive a threshold change by the user.

While the example where the image forming mode name, the sheet type, and the grammage range are displayed as a determination result based on a sheet detection result of the media sensor 100 is described above, this is not intended to be a limitation. Other information about physical properties that can be detected by the media sensor 100 may be displayed as a determination result. For example, not a grammage range but a grammage value may be displayed (e.g., 77 [g/m^2] may be displayed).

The media sensor 100 described above is a mere example according to the exemplary embodiment and is not intended to be a limitation. While the example where the media sensor 100 is disposed inside of the main body 201A of the image forming apparatus 201 is described above, this is not intended to be a limitation. For example, the media sensor 100 may be disposed outside of the main body 201A of the image forming apparatus 201. In this case, the media sensor 100 includes an insertion slot for inserting a sheet manually by the user, and in a case where a sheet is inserted into the insertion slot by the user, the media sensor 100 detects the sheet. The control unit 400 performs sheet determination based on the detection result of the media sensor 100. While the image forming mode database 402 is stored in the memory 401 according to the present exemplary embodiment, this is not intended to be a limitation.

For example, the media sensor 100 may include a database and perform sheet determination.

Furthermore, while the example where the image forming mode is determined by determining the sheet type and the grammage based on physical properties of the sheet detected by the media sensor 100 is described above, this is not intended to be a limitation. For example, the media sensor 100 may be another sheet physical property measurement device and may determine the image forming mode directly from detected feature amounts of the sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-117862, filed Jul. 19, 2023, which is hereby incorporated by reference herein in its entirety.

What is claimed is:

1. An image forming apparatus comprising:

a printer configured to form an image on a sheet;

a sheet detection unit including one or more sensors configured to detect a physical property of the sheet;

a controller including one or more processors and at least one memory storing one or more programs configured to be executed by the one or more processors, the controller configured to determine sheet information based on a result of the detection performed by the sheet detection unit and a threshold; and an operation unit including a touch panel display configured to display the sheet information determined by the controller and receive a user instruction to change the threshold, wherein, in a case where the operation unit receives the user instruction to change the threshold, the controller determines sheet information based on the result of the detection and the changed threshold, and the operation unit displays the sheet information, wherein the sheet information includes a determination rate, and wherein, in a case where the operation unit displays two or more candidates for the sheet information, the operation unit arranges and displays the two or more candidates in descending order of the determination rate.

2. The image forming apparatus according to claim 1, wherein the operation unit displays both a key for changing the threshold and the sheet information.

3. The image forming apparatus according to claim 1, wherein the sheet information includes sheet type information.

4. The image forming apparatus according to claim 1, wherein the sheet information includes grammage information.

5. The image forming apparatus according to claim 1, wherein the sheet information includes sheet type information and grammage information.

6. The image forming apparatus according to claim 1, wherein the sheet detection unit includes an ultrasonic sensor.

7. The image forming apparatus according to claim 1, wherein the sheet detection unit includes an optical sensor.

* * * * *